United States Patent [19]

Anderson et al.

[11] Patent Number: 5,157,783

[45] Date of Patent: Oct. 20, 1992

[54] DATA BASE SYSTEM WHICH MAINTAINS PROJECT QUERY LIST, DESKTOP LIST AND STATUS OF MULTIPLE ONGOING RESEARCH PROJECTS

[75] Inventors: Brian P. Anderson, Weare, N.H.; Barbara C. Sangster, Wellesley Hills; Richard Kasson, Harvard, both of Mass.; Shirley A. Zierke, Wyoming, Minn.; Gerald V. Peterson, Forest Lake, Minn.; Charles E. Shapiro, Minneapolis, Minn.; J. Scott Daup, Maplewood, Minn.

[73] Assignees: Wang Laboratories, Inc., Lowell, Mass.; West Publishing Co., St. Paul, Minn.

[21] Appl. No.: 160,959

[22] Filed: Feb. 26, 1988

[51] Int. Cl.⁵ .................................... G06F 15/40
[52] U.S. Cl. .................... 395/600; 395/145; 364/419; 364/927.7; 364/974.6; 364/943; 364/DIG. 2
[58] Field of Search .................. 395/600, 425, 145; 364/419, 200 MS File, 900 MS File

[56] References Cited

U.S. PATENT DOCUMENTS

| | | | |
|---|---|---|---|
| 4,422,158 | 12/1983 | Galie | 364/900 |
| 4,495,566 | 1/1985 | Dickinson et al. | 364/200 |
| 4,503,499 | 3/1985 | Mason et al. | 364/200 |
| 4,713,754 | 12/1987 | Agarwal et al. | 364/200 |
| 4,754,326 | 6/1988 | Kram et al. | 364/900 |
| 4,774,661 | 9/1988 | Kumpati | 364/300 |
| 4,827,477 | 5/1989 | Croes et al. | 364/900 |

FOREIGN PATENT DOCUMENTS 0121072 10/1984 European Pat. Off. .......... 364/200

Primary Examiner—Thomas C. Lee
Assistant Examiner—Ayni Mohamed
Attorney, Agent, or Firm—Michael H. Shanahan

[57] ABSTRACT

Research apparatus for performing research on books stored either locally on magnetic or optical media or remotely in an on-line data base. A user of the research apparatus performs research in a project whose state is automatically saved on non-volatile storage, permitting a user to suspend and resume work on the project. The project state includes a list of the books being used by the project and for each book, the last location read and the last query executed on the book. The user selects one book as the current book, and when the selection is made, the research apparatus automatically displays text from the current book which contains the last location read. If there was a query active, the research apparatus automatically re-executes the query. If the current book is stored on an on-line data base, the research apparatus automatically establishes a connection with the on-line data base. Each book has an ordered document list of the documents in the book, and movement through a displayed book is governed by the order of the documents. Execution of a query on a book produces a subset list of documents satisfying the query which is ordered like the document list. The publisher of the book may further provide alternate orders for the document list. Further features of the project state include a list of all the queries made in a project and a list of display states which may be restored by the user.

31 Claims, 19 Drawing Sheets

PRS FUNCTIONAL OVERVIEW

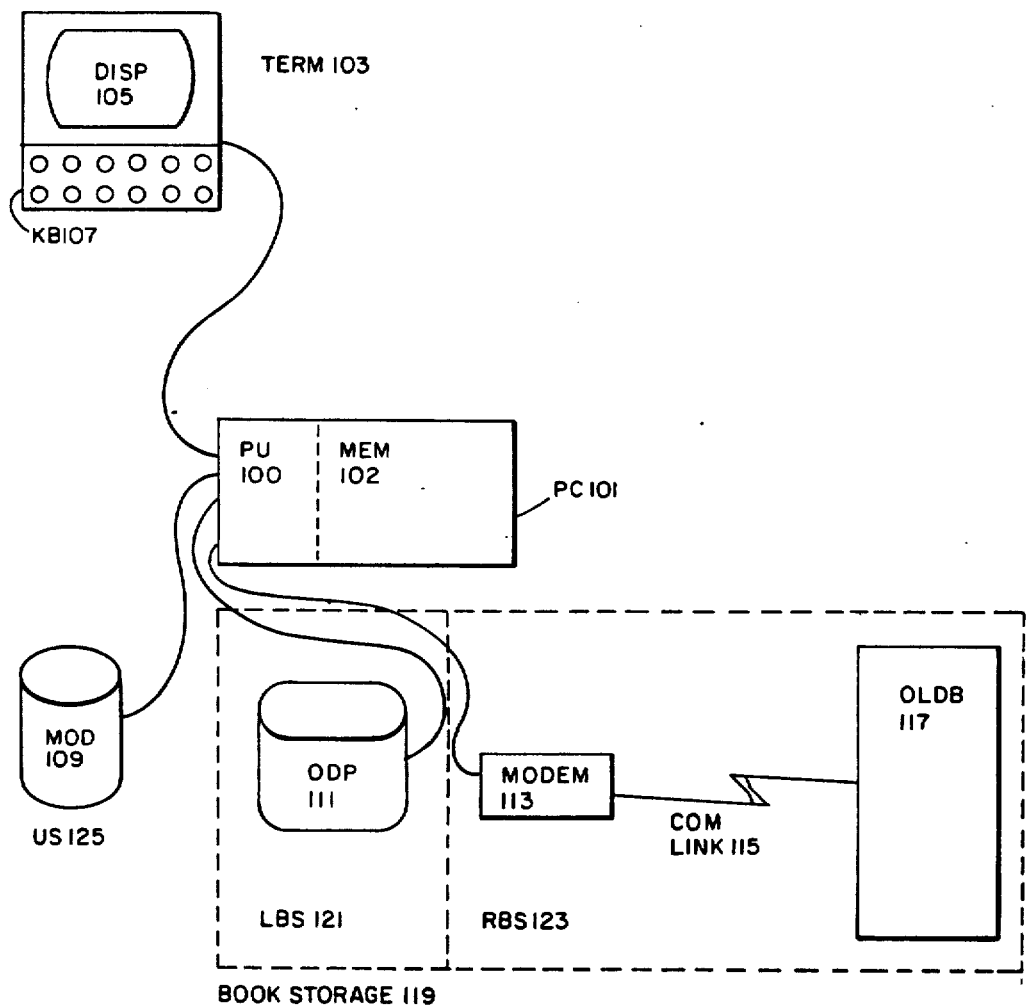
FIG. 1: PRS HARDWARE

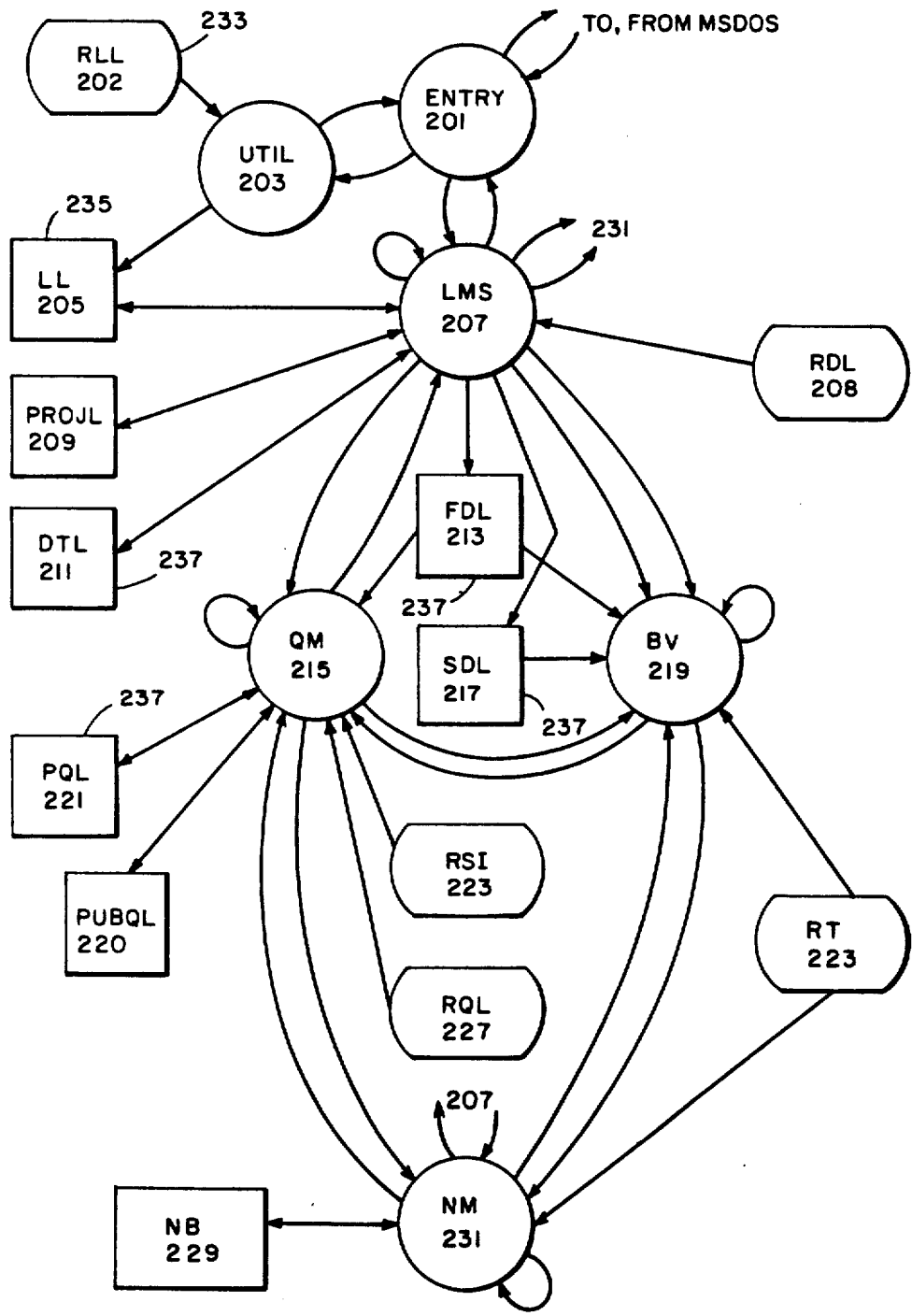
FIG. 2: PRS FUNCTIONAL OVERVIEW

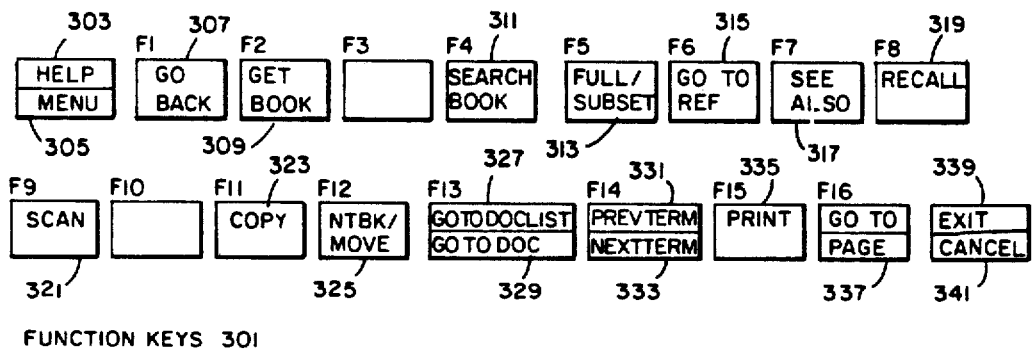
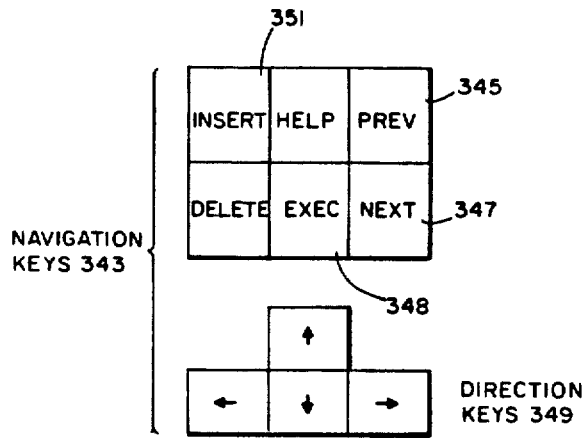
FIG. 3: KB 107 FUNCTION AND NAVIGATION KEYS
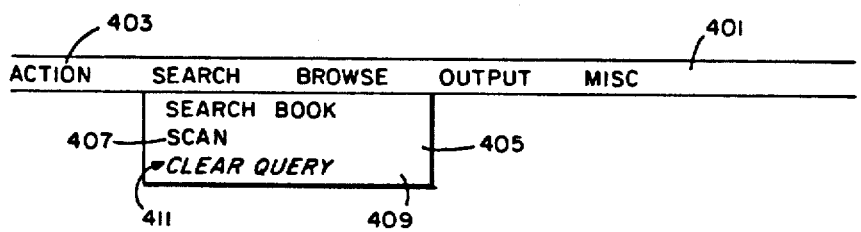
FIG. 4: MENU KEY COMMAND BAR AND PULL-DOWN MENU

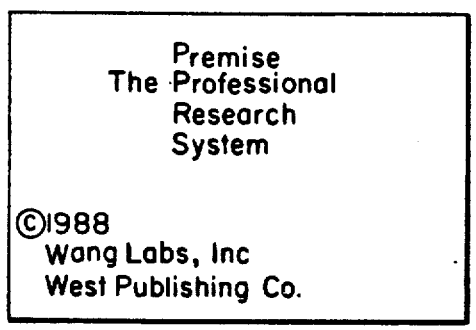
BOOT SCREEN 501
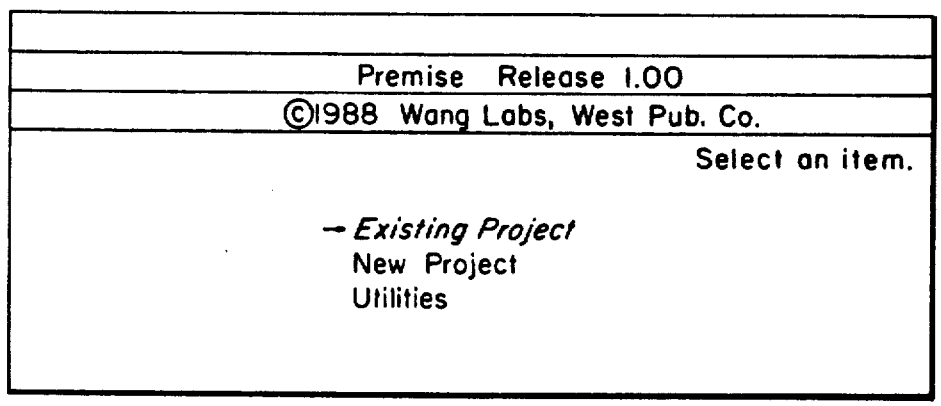
ENTRY MENU 503
FIG. 5: Screens for Entry State 201
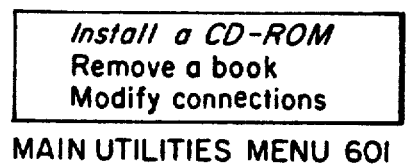
MAIN UTILITIES MENU 601
FIG. 6: Screens for Utility State 203

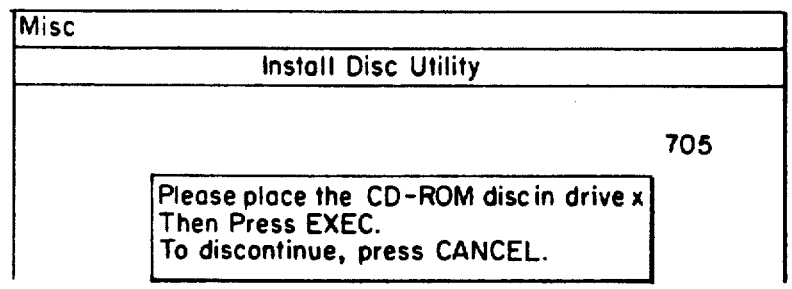
INSTALL DISC SCREENS 701
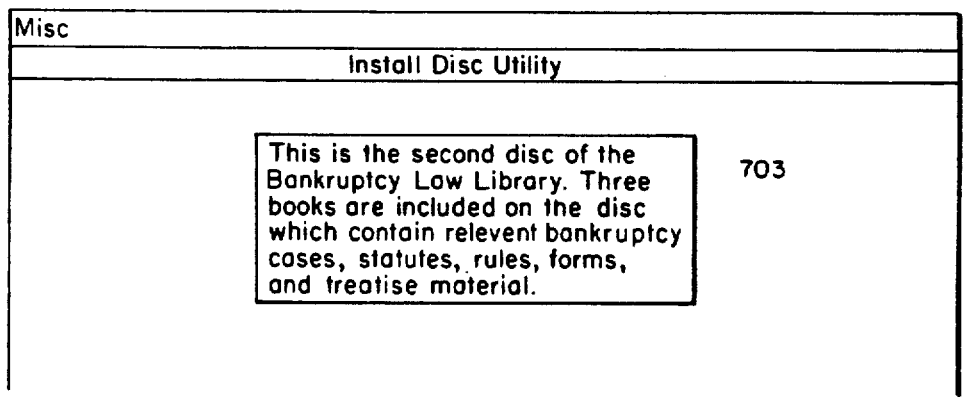
REMOVE BOOK SCREEN 707
FIG. 7: SCREENS FOR UTILITY STATE 203

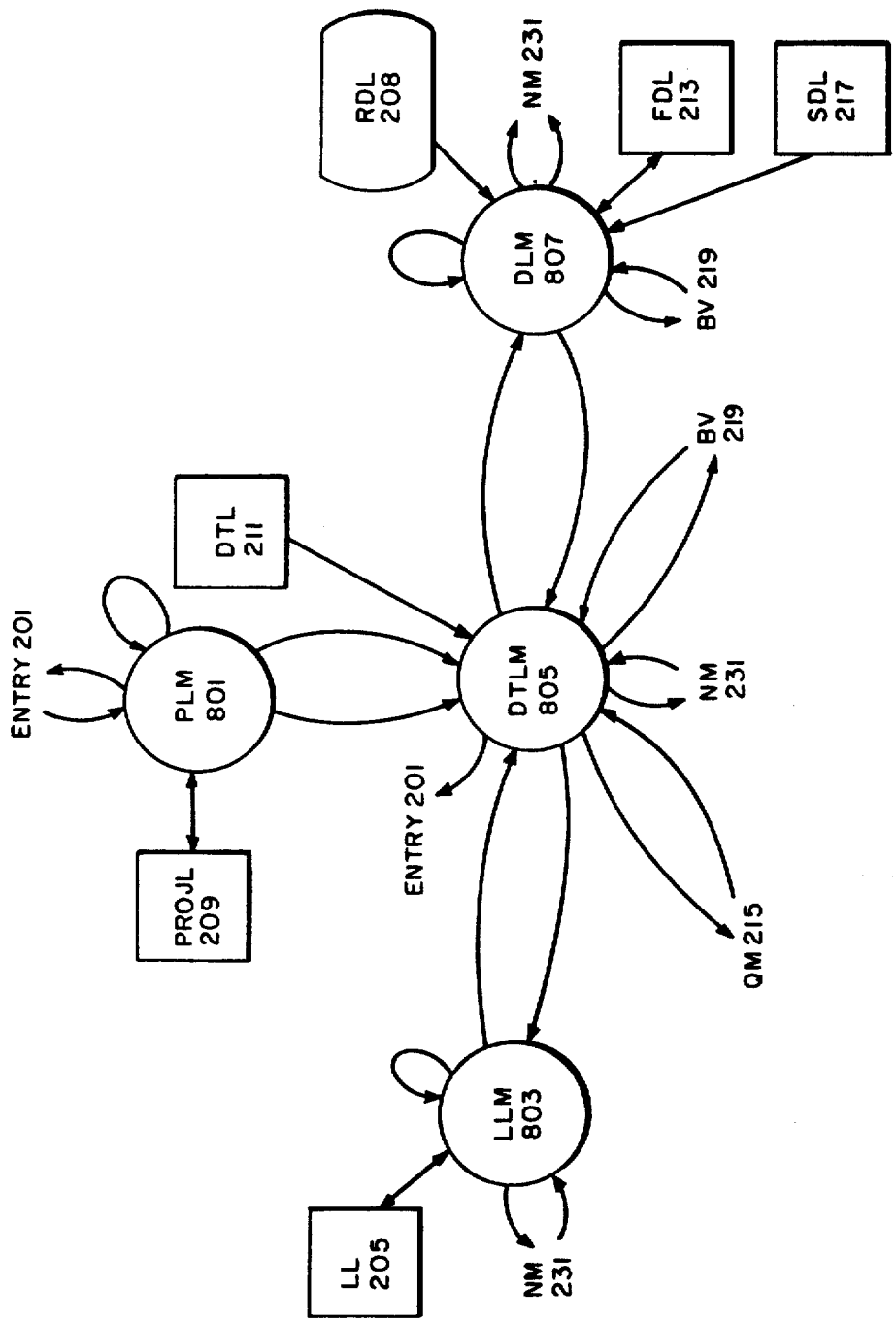
FIG. 8: SUBSTATES OF LMS 207

```
                                    ┌─403          ┌─401
┌───────────────────────────────────┴──────────────┴─────────────────┐
│ Action   Misc   Utility                                            │
├────────────────────────────────────────────────────────────────────┤
│                                                  905___Projects    │
├────────────────────────────────────────────────────────────────────┤
│ Page 1 of 1 (15 items)                                             │
├────────────────────────────────────────────────────────────────────┤
│       ╲─903              ┌─909                    Select a project │
│       Project Name       Description              907─┘            │
│  ┌─   Training           Default project, introductory information│
│  │   ─FineyTax           Finey's tax liability                     │
│  │    Smith vs. Jones    Smith assault case                        │
│911│   Venn Will          Contested will w/bankruptcy               │
│  │    Martin vs. Walton  State limitations on lawyer's practice in other states│
│  │      913                                                        │
│  └    Caleth vs. Minnesota  Bankruptcy proceedings against Caleth farm│
└────────────────────────────────────────────────────────────────────┘
PROJECT LIST SCREEN 901

┌────────────────────────────────────────────────────────────────┐
│ Deleting this project will remove all Books from the Desktop,  │
│ all Project Queries and the Notebook. Do you really want to    │
│ delete this project? To delete the project, press EXEC.        │
│ To discontinue, press CANCEL.                                  │
└────────────────────────────────────────────────────────────────┘
DELETE PROJECT DIALOG BOX 915

┌────────────────────────────────────────────────────────────────┐
│ Misc                                                           │
├────────────────────────────────────────────────────────────────┤
│                    Start new project                           │
│                                              Enter information.│
│                                                                │
│         Project:     Enter project name here. (21 characters)  │
│         Description: Enter project description here. (56 characters)│
└────────────────────────────────────────────────────────────────┘
START NEW PROJECT SCREEN 917

┌────────────────────────────────────────────────────────────────┐
│ Misc                                                           │
├────────────────────────────────────────────────────────────────┤
│                  Edit Project Information                      │
│                                                  Enter changes.│
│                                                                │
│         Project:     Finey Tax                                 │
│         Discription: Finey's tax liability                     │
└────────────────────────────────────────────────────────────────┘
EDIT PROJECT INFORMATION SCREEN 919
```

FIG. 9: PROJECT LIST MANAGER STATE SCREENS

```
                1003         401
              Action / Libraries  Misc
              Project: Finey Tax                              Books on Desk
              Page 1 of 3 (56 items)
                                   1007          1009    Select a book
              Title                Last Document  Last Query
       1005   Training Book        [NS] Welcome   research & query
              •U. S. Supreme Court Decision  82 S. Ct. 22  title (johnson) &
                                                          Kansas
              U.S. Ct. of Appeals, 2nd Ci    5427   drank/p car auto autom
       1011
```

DESK TOP LIST SCREEN 1001

```
              This desk contains no books. To view
              the library lists, select the library
              pull-down menu.
```

EMPTY DESK TOP LIST DIALOG BOX 1015

```
              The last SUBSET list for this book was not
              saved. Please select:
                → Restore SUBSET LIST, then open Book
                  Open Book Immediately
```

NO SUBSET LIST DIALOG BOX 1013

FIG. 10: DESKTOP LIST MANAGER STATE SCREENS

```
                                                             1103
              Action   Libraries  Misc
              Project:  Finey    Tax                    CDROM Library
              Page 1 of 3 (53 items)
                                                         Select a book
              ID        Title                 Publisher   Disc #
              Training  How to use the system West Publishing Co  WPC0001
              SCT       U.S. Supreme Court Dec...  West Publishing Co  WPC0172
              CA-2      U.S. Ct of Appeals, 2nd Cir  West Publishing Co  WPC0102
              BKR-CODE  U.S. Code Title 11, Bankruptcy  West Publishing Co  WPC0010
                1105         1107                 1109         1111
              Blacks    Black's Law Dictionary  West Publishing Co  WPC0195
```

LIBRARY LIST SCREEN 1101

FIG. 11: LIBRARY LIST MANAGR STATE SCREEN

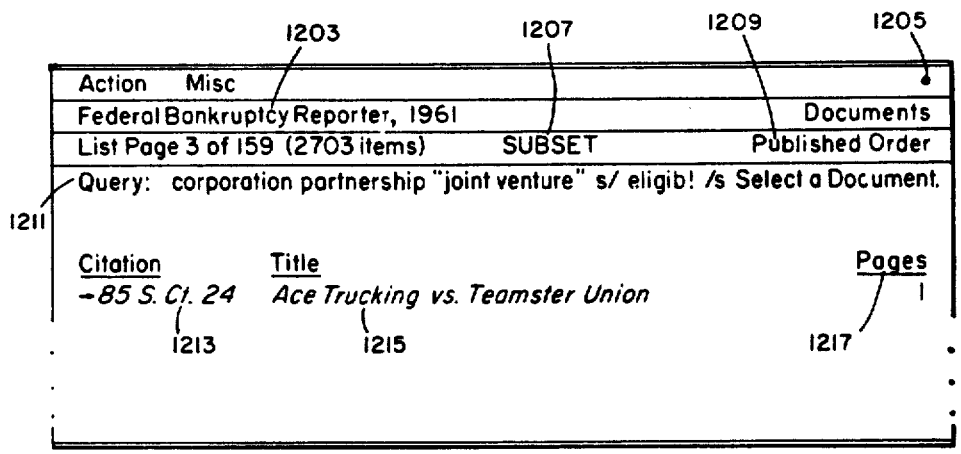
Document List Screen 1201
FIG. 12: Screen for Document List Manager State 807
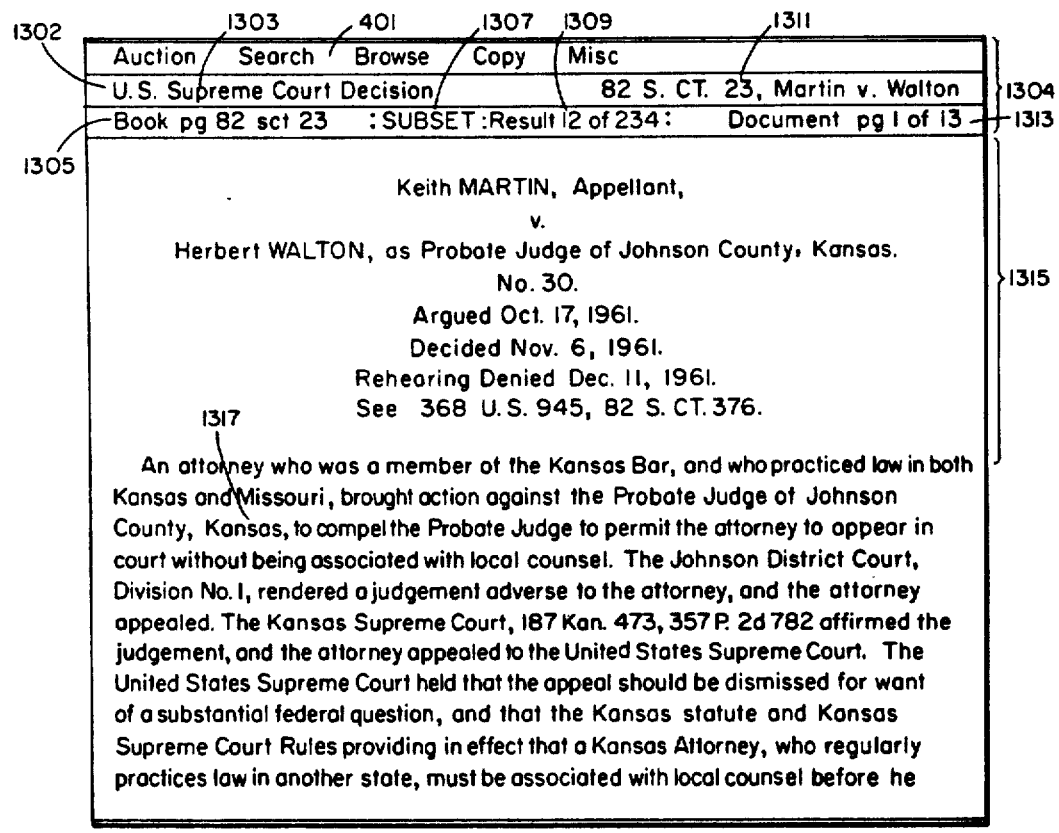
QUERY Screen 1301
FIG. 13: Screens in Bookview State 219

```
┌─────────────────────────────────────────────────────────────┐
│ Action   Search   Browse   Copy    Misc                     │
├─────────────────────────────────────┬───────────────────────┤
│ Bankruptcy Code, Rules and          │ Chapter 13 - Adj. of Depts of an individual │─1304
├─────────────────────────────────────┼───────────────────────┤
│ Book pg BCRF330                     │        Document pg 8 of 9 │
├─────────────────────────────────────┴───────────────────────┤
``` hearing, the court may convert a case under this chapter to a case under chapter 11 of this title.

(e) The court may not convert a case under this chapter to a case under ─1403

================================================== chapter 7 or 11 of this title if the debtor is a farmer, unless the debtor requests such conversion.

(f) Notwithstanding any other provision of this section, a case may not be converted to a case under another chapter of this title unless the debtor may be a debtor under such chapter.

Pub. L. 95=598, Nov. 6, 1987, 92 Stat. 2647. Paragraph (c)(4) added by Sec. 315; Paragraphs (c)(5), (7) and (8) amended by Sec. 527 o Pub. L. 98-353, July 10, 1984, 98 Stat. 333.

End of Document

No Query Screen 1401                                   1405

FIG. 14: Screens in Bookview State 219

```
┌─────────────────────────────────────────────────────────────────┐
│ Action   Search   Browse   Copy                                 │
├─────────────────────────────────────────────────────────────────┤
│ U. S. Supreme Court Decision, 1961-1975    82 S. Ct. 23, Martin v. Walton │
├─────────────────────────────────────────────────────────────────┤
│ Book pg 82sct23      :Subset :Result 12 of 234:   Document pg 1 of 13 │
├─────────────────────────────────────────────────────────────────┤
│                                                Select a reference. │
│                   Keith MARTIN, Appellant           1503           │
│                              v.                                    │
│       Herbert WALTON, as Probate Judge of Johnson County, Kansas. │
│                            No. 30.                                 │
│                       Argued Oct. 17, 1961.                        │
│                       Decided Nov. 6, 1961.                        │
│                    Rehearing Denied Dec. 11, 1961.                 │
│                    See  368 U.S. 945, 82 S.Ct. 376.                │
│                                                       1505         │
│   An attorney who was a member of the Kansas Bar, and who practiced law in both │
│   Kansas and Missouri, brought action against the Probate Judge of Johnson │
│   County, Kansas, to compel the Probate Judge to permit the attorney to appear in │
│   court without being associated with local counsel. The Johnson District Court, │
│   Division No. I, rendered a judgement adverse to the attorney, and the attorney │
│   appealed. The Kansas Supreme Court, 187 Kan. 473, 357 P. 2d 782, affirmed │
│   the judgement, and the attorney appealed to the United States Supreme Court. │
│   The United States Supreme Court held that the appeal should be dismissed for │
│   want of a substantial federal question, and that the Kansas statute and Kansas │
│   Supreme Court Rules providing in effect that a Kansas Attorney, who regularly │
└─────────────────────────────────────────────────────────────────┘
```

GO TO REF Screen 1501

```
┌─────────────────────────────────────────────────────────────────┐
│ Action   Search   Browse   Copy   Misc                          │
├─────────────────────────────────────────────────────────────────┤
│ U. S. Supreme Court Decision...              82 S. Ct. 23, Martin v. Walton │
├─────────────────────────────────────────────────────────────────┤
│ Book pg 82sct23      :Subset :Result 12 of 234:   Document pg 1 of 13 │
├─────────────────────────────────────────────────────────────────┤
│                                                Select a reference. │
│   The potential See Also reference for the above document are:    │
│   Shepard's Citations                                              │
│   Insta-Cite              ⎫                                        │
│   Cowan's Bankruptcy Law  ⎬ 1509                                   │
│                           ⎭                                        │
│                                                                    │
│                                                                    │
└─────────────────────────────────────────────────────────────────┘
```

SEE ALSO Screen 1507

FIG. 15: Screens in Bookview State 219

```
Action   Recall   Misc
1603 — Bankruptcy Code, Rules and...                    Search —1605
                         401                       Enter query, —1607

┌────────────────────────────────┐
                    │ : . . . . . . . . . . . . . . .│
                    │ : . . . . . . . . . . . . . . .│
                    │ : . . . . . . . . . . . . . . .│
                    │ . . . . . . . . . . . . . . . .│
                    └────────────────────────────────┘
                                            )
                                           1609
```

Query Formulating Screen 1601

| FIELDS | CONTEXT & PROXIMITY | BOOLEAN, OTHER SYMBOLS |
|---|---|---|
| Citation | Within: Slash ( / ) | Boolean: AND, OR, NOT |
| Title | /n   in 'n' words of | &   both terms in doc |
| Date | /s   in same sent. | either term in doc |
| Topic | /p   in same para. | %   term not in doc |
| Court | | |
| Digest | Precedes: Plus (+) | Symbols |
| Synopsis | +n   precedes by 'n' words | #   no equivalent terms |
| Opinion | +s   precedes in sent | *   single-char subs |
| Headnote | +p   precedes in para. | !   multi-char sub/expand |
| Settlement | | " "  phrase delimiter |

Assists Window 1611

FIG. 16: Screens for Query Manager State 215

| Action   Misc | |
|---|---|
| Project:   Finey Tax | Project Queries |
| Page 1 of 17 (347 items) | |
| | Select a query. |
| Query Text | Docs Book Name |
| bankruptcy /2 judge /s "article iii" | 3  Federal Bankrupt... |
| — trustee /s fail*** declin *** /s bring prosecute /s s... | 2  Federal Bankrupt... |
| corporation partnership "joint venture" s/ eligib! /... | 12  U.S. Ct. of Appe... |
| 1703 | 1705    1709 |
| trustee /s requir! duty /s clos*** /s estate /s quickly | 33  U.S. Supreme Cou... |
| mosser +3 darrow | 1  Federal Bankrupt... |

Query List Screen 1701

FIG. 17: Screens for Query Manager State 215

```
1803          ╭─────────401─────────────────────────1805
              │ Copy      Misc        │
1807          │ Project: Johnson & Kansas       Notebook
              │ Pos. 1   Line 23   Page 67         1809
              │ >....>....>..........................<
              │ An attorney who was a member of the Kansas Bar, and who practiced law in both
              │ Kansas and Missouri, brought action against the Probate Judge of Johnson
              │ County, Kansas, to compel the Probate Judge to permit the attorney to appear in
              │ court without being associated with local counsel. The Johnson District Court,
              │ Division No. 1, rendered a judgement adverse to the attorney, and the attorney
              │ appealed. The Kansas Supreme Court, 187 Kan. 473, 357 P. 2d 782, affirmed the
              │ judgement, and the attorney appealed to the United States Supreme Court. The
              │ United States Supreme Court held that the appeal should be dismissed for want
1811          │ of a substantial federal question, and that the Kansas statute and Kansas
              │ Supreme Court Rules providing in effect that a Kansas Attorney, who regularly
              │ practices law in another state, must be associated with local council before he
              │ can appear in Kansas, both on their face and as applied to the attorney, were
              │ not beyond allowable range of state action under Fourteenth Amendment to
              │ Kansas and Missouri, brought action against the Probate Judge of Johnson
              │ County, Kansas, to compel the Probate Judge to permit the attorney to appear in
              │                                                                    1813
              │ =====================================================
              │ court. By state law, any attorney must be associated with local council before
              │ he can appear in Kansas, both on their face and as applied to attorney, who was
              │ member of Kansas Bar and who practiced law in both Kansas and Missouri, were
              ╰─────────────────────────────────────
              Notebook Screen 1801
```

FIG. 18: Screen for Notebook Manager State 231

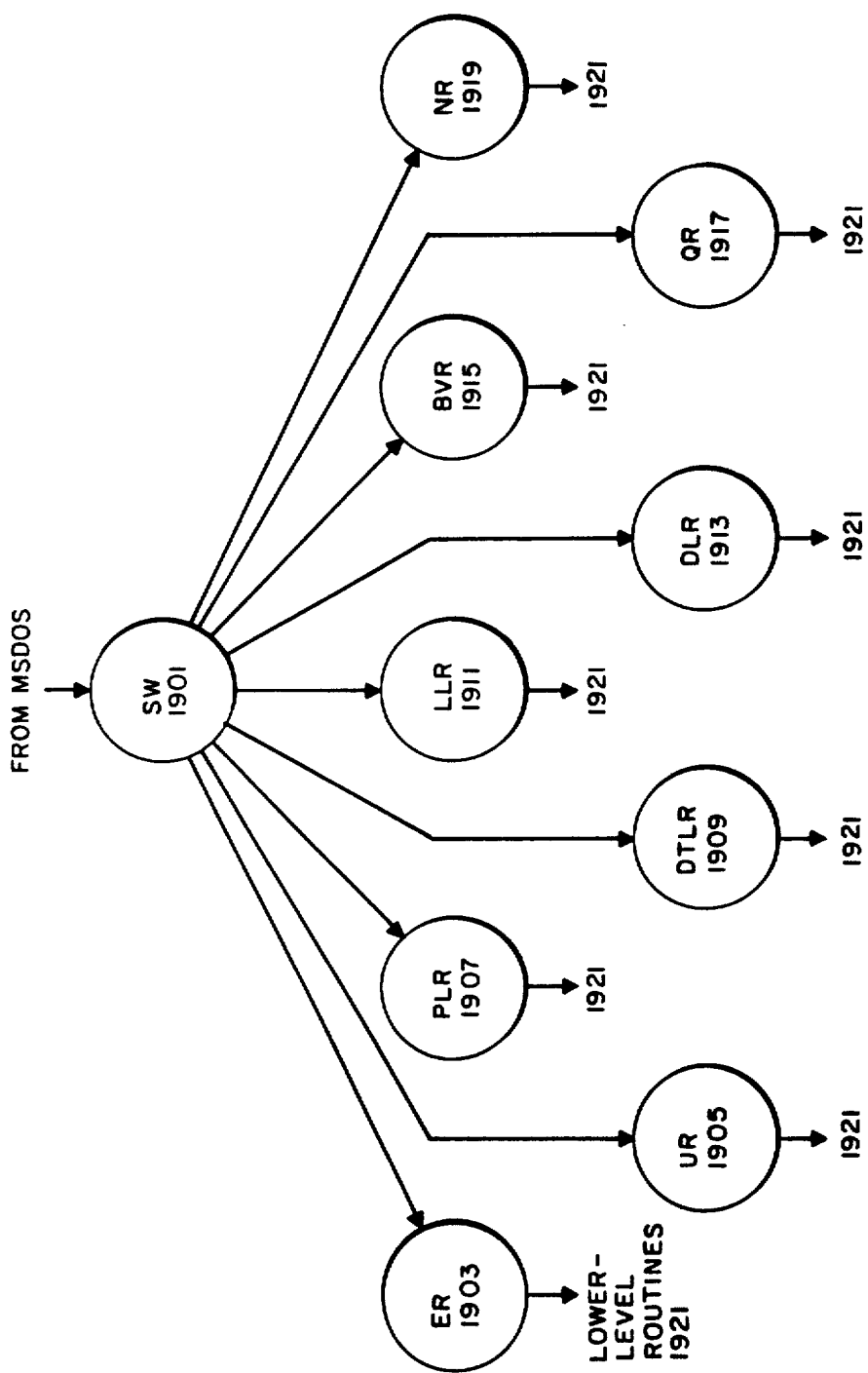
FIG. 19: PRS TOP-LEVEL STRUCTURE

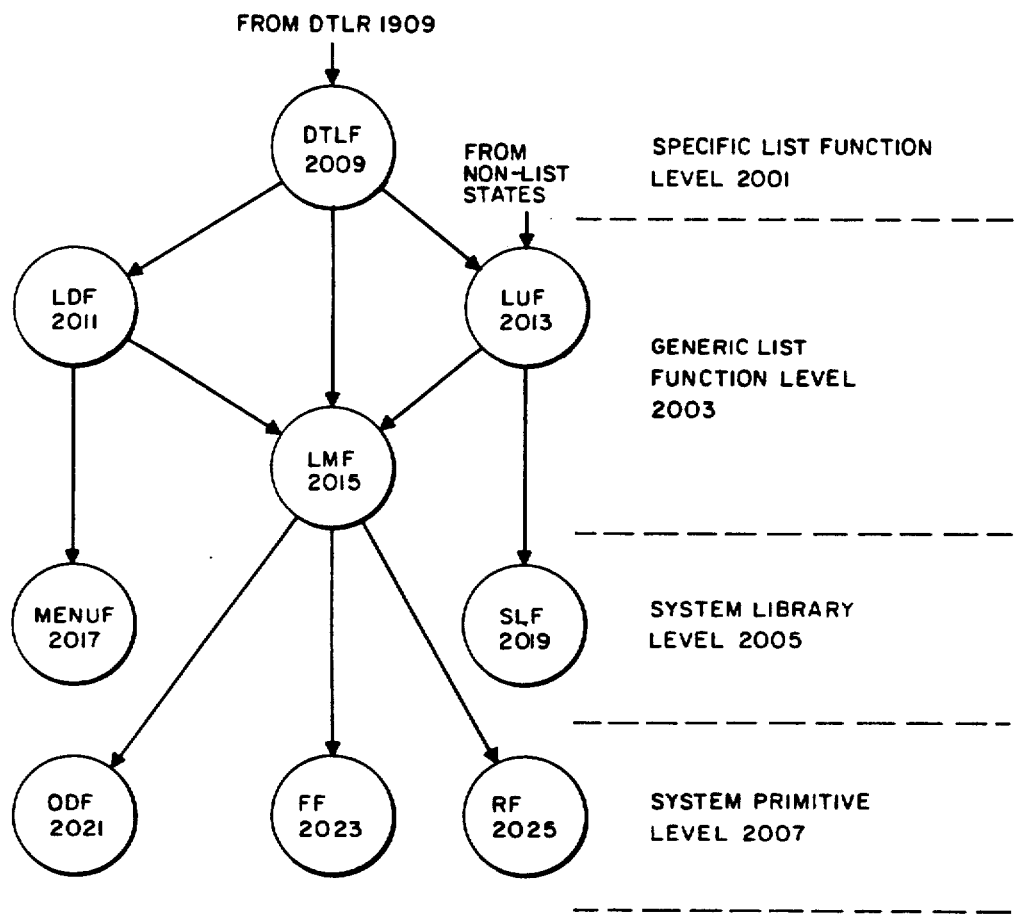
FIG. 20: STRUCTURE OF LIST MANAGER LOW-LEVEL ROUTINE 1921

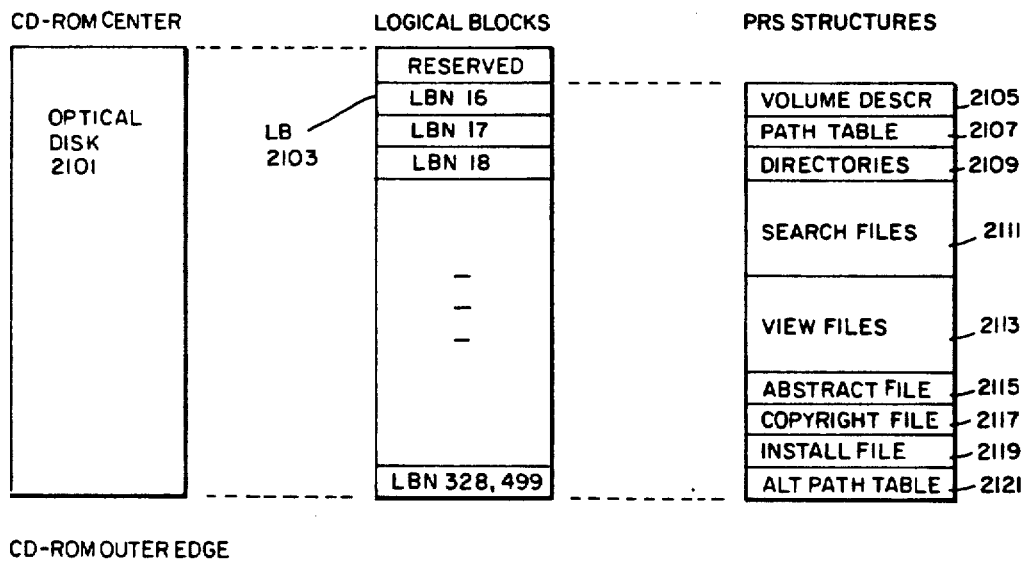
FIG. 21: OPTICAL DISK OVERVIEW
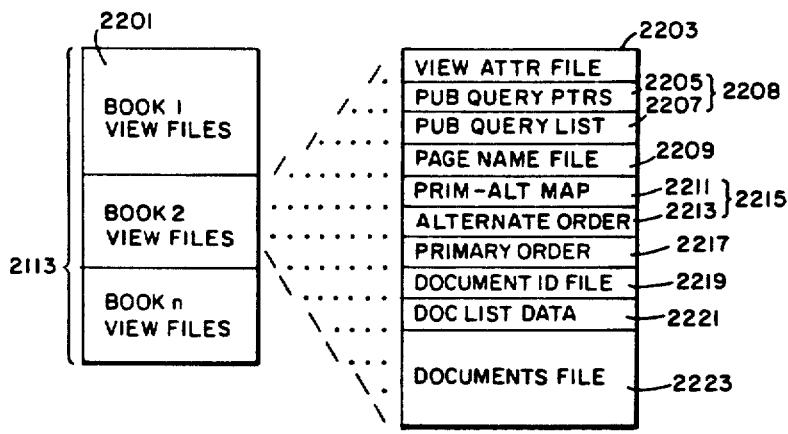
FIG. 22: DETAIL OF VIEWFILES 2113

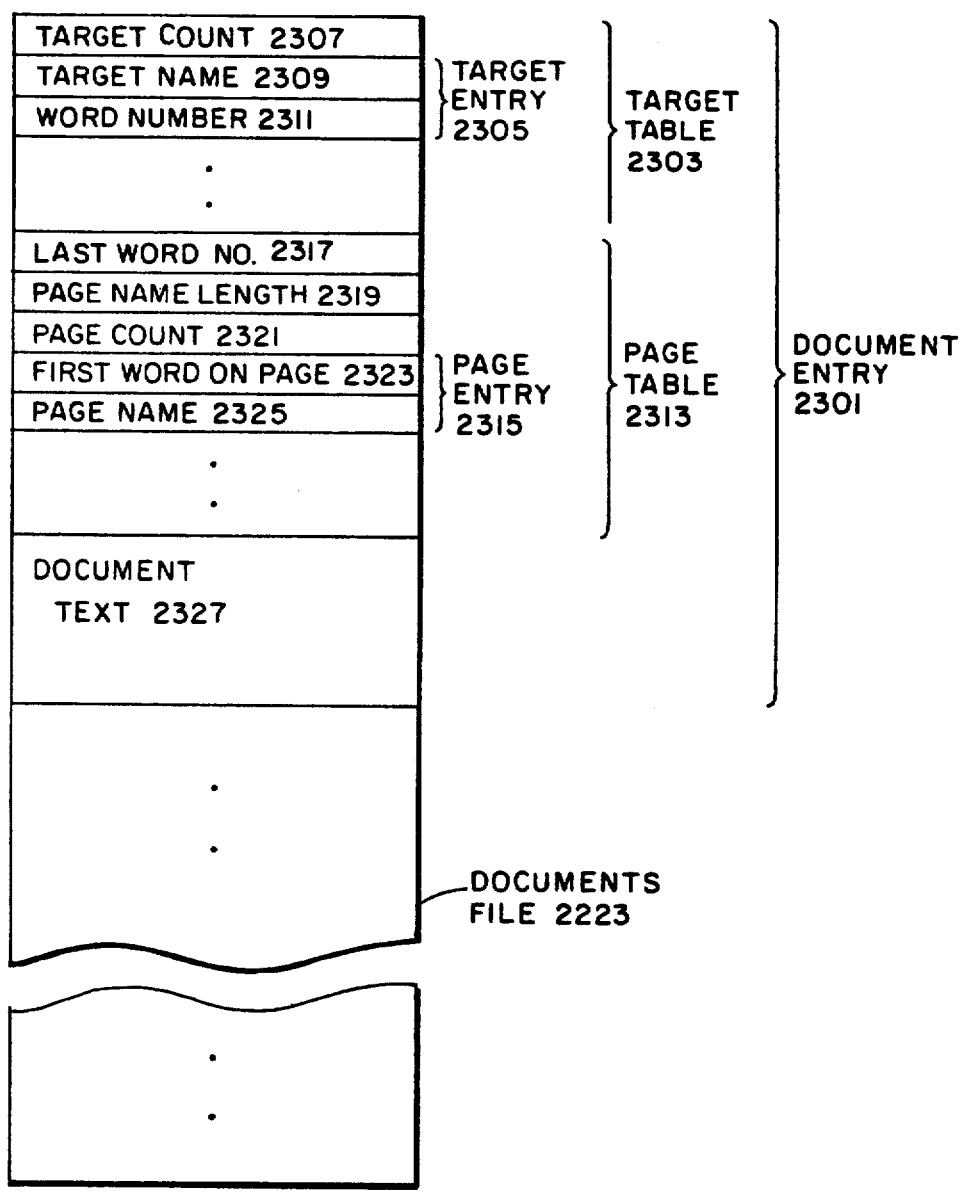
FIG. 23: OVERVIEW OF DOCUMENTS FILE 2223

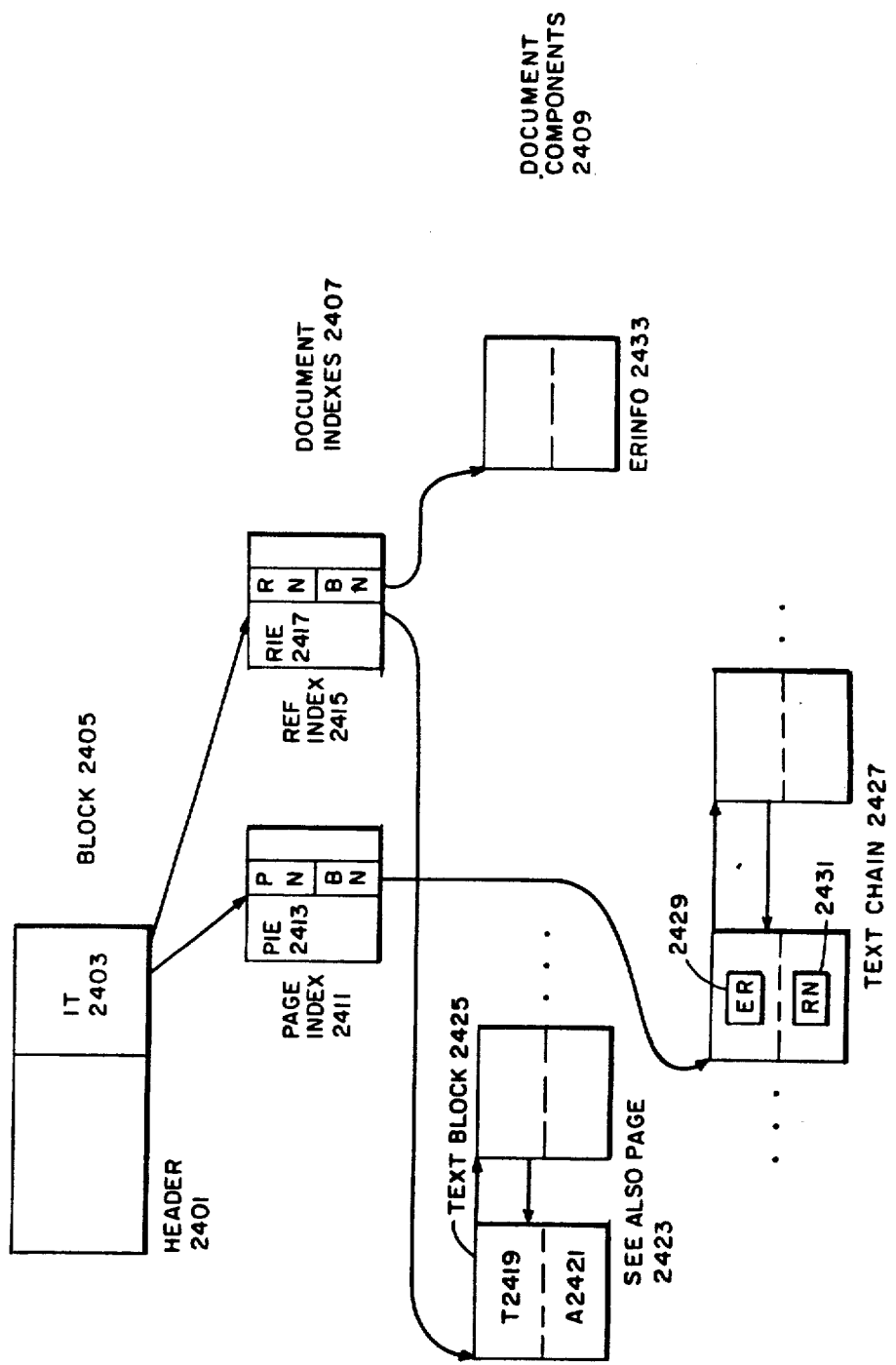
FIG. 24: DETAIL OF DOCUMENT TEXT 2327

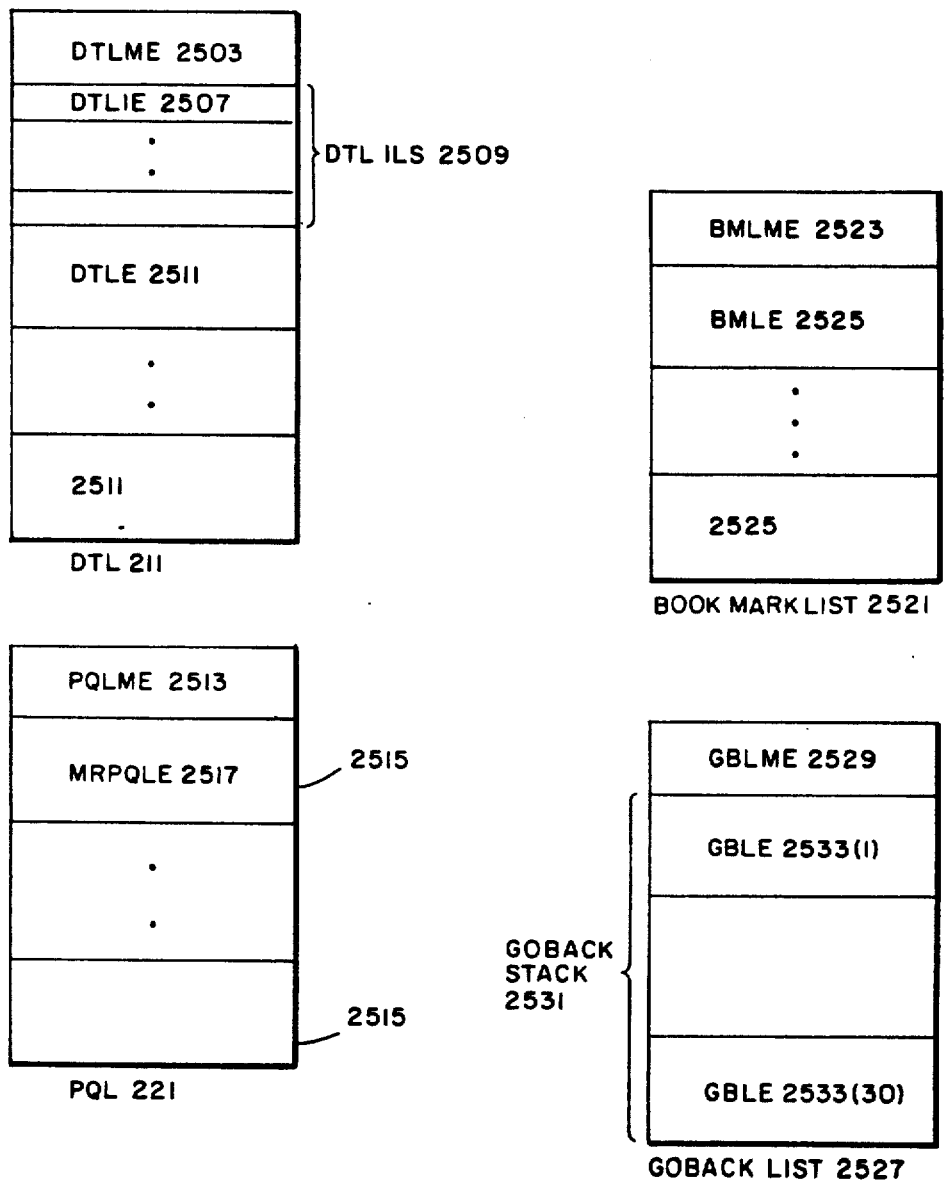
FIG. 25: PER-PROJECT CBAM LISTS 2501

DATA BASE SYSTEM WHICH MAINTAINS PROJECT QUERY LIST, DESKTOP LIST AND STATUS OF MULTIPLE ONGOING RESEARCH PROJECTS

BACKGROUND OF THE INVENTION

1. Field of the Invention

This invention relates to computerized systems for accessing information and more particularly to computerized systems for performing research on a body of literature.

2. Description of the Prior Art

The development of random-access mass storage devices for use in computer systems was quickly followed by the development of data base systems which permitted the computer to quickly access information stored in the mass storage devices by means of keys identifying the records in which the information was stored. Query languages in such systems permitted users to specify a subset of the information contained in the data base by specifying one or more keys and operators on the keys. In response to such a specification, the data base system output all records which satisfied the specification. As the cost of mass storage and memory decreased and the power of processors increased, full text retrieval systems were developed in which the data base consisted of text and every word of the text could serve potentially as a key. The query languages in such systems permitted users to specify queries by means of the words in the text and operators which included not only the operators of older data base systems, but also operators specifying information such as the proximity to each other in the text of the words used in the query.

The first-full text retrieval systems were difficult and expensive to use, and were consequently employed principally by specialists such as reference librarians. Moreover, the cost of mass storage was still high enough that individual researchers could not afford enough mass storage to store large text data bases. The full-text retrieval systems thus generally featured large central data bases to which users could gain access by means of telephone lines. As expensive and difficult to use as they were, the first full-text retrieval systems proved so valuable that improved full-text retrieval systems were developed which were designed specifically for use by professionals such as doctors and lawyers rather than librarians.

An example of such a full-text retrieval system is the WESTLAW( TM ) system, developed by West Publishing Company, St. Paul Minn. WESTLAW is an interactive full-text retrieval system for performing legal research on a large on-line data base of legal documents such as cases and statutes. Users of the system have terminals or personal computers which are connected by telephone to the on-line data base. The user performs research by inputting short commands and queries from his terminal to Westlaw. By means of commands, he specifies a part of the data base such as a reporter for cases decided by a given group of courts. Having done this, he composes a query to be run on the reporter. The system runs the query and makes a list of cases from the reporter which satisfy the query. The list is ordered by the number of times the query is satisfied in the case. The user may access the text of the cases by moving from one location at which the query term appears to the next or by selecting a case from the list and reading that case. Once the user is reading the text of a case, he may move forward or backward from one page to the next. By running a query, reading cases which satisfy the query, using what he learns to refine the query, and running the refined query, the user can define a subset of cases which are exactly "on point" for the legal question he is researching. The user can command WESTLAW to provide part or all of the text of particularly interesting cases, and WESTLAW will send the cases via the telephone line for print out at the user's printer.

While systems such as WESTLAW were successful, the need for telephone line-access to a central data base and the need to memorize commands limited their use. For example, WESTLAW was typically used by research paralegals in large law firms and not by lawyers themselves. These drawbacks were overcome by two developments: powerful personal computers became available at prices which any individual professional practitioner could afford, and CD-ROM optical disks enormously reduced the cost of read-only mass storage. The power of the personal computers permitted better user interfaces to the full text retrieval systems. The CD-ROM disks made text data bases cheaper than books. Every professional user could afford to acquire CD-ROM disks with the information necessary in his field, and the central data bases were now required only for information too recent to be published on a CD-ROM disk. CD-ROM based research systems for personal computers appeared which could be used in the same fashion as WESTLAW, and had such additional features as improved user interfaces employing menus or function keys, "following" a reference embedded in one text to its location in another, output from the optical disks to documents, spreadsheets, or "notepads", and commands permitting users to save the present "state" of a research project so that work could be continued at that point later on. Examples of such CD-ROM based research systems for personal computers include Silversmith, manufactured by Taunton Engineering, Inc., Billerica, Mass., and Research Retrieval and Data Base System, manufactured by TMS, Inc., Stillwater, Okla.

While the CD-ROM based research systems for personal computers overcome many of the cost and ease-of-use difficulties of the on-line research systems, problems remain. Among them are the following: Professional researchers typically do research on several projects at once; present research systems do not accommodate that mode of work. Professional researchers are also typically able to define useful subsets of all of the information in the data base before they begin researching; present systems do not permit him such a definition. Different kinds of research may be more convenient if the same information can be presented in different orders; present systems present the information in a single order. Present systems permit the user to save what he perceives as significant, but users often fail to save what turns out later to be important. Present systems further cannot tailor the manner in which an embedded cross-reference is followed to the user's environment and cannot associate other information which might be valuable to the user of a document with the document. Present systems further do not permit a user to both locate information and work on it within the research system. Moreover, even with the improvements resulting from the availability of personal computers and optical disks, the user interface of present research systems often makes the transition from bookoriented to electronic research more difficult than necessary. It is an object of the invention to provide an improved research system which solves these and other problems of present research systems.

SUMMARY OF THE INVENTION

The apparatus to be described performs research upon books. The apparatus includes non-volatile storage, a display, an input device, and a processor coupled to the non-volatile storage, the display, and the input device. The non-volatile storage includes readable storage for storing the books and readable and writable storage for storing project state for one or more research projects being performed on the research apparatus. The state for each project includes an indicator of a current book and an indicator of a location in the text of of the current book. The display displays a visual representation of a portion of the text of a stored book. The input device receives inputs from a user of the research apparatus. The processor means responds to an input from the input device which indicates resumption of work on a given project and to an input from the input device which indicates the display of text on the display device by automatically displaying a visual representation of a portion of the text of the book specified by the current book indicator which contains the location specified by the location indicator.

In other aspects of the research apparatus, the process state further includes desk top information for each of the books currently being used in a project. Information from the desk top information for a book includes the book's title, the last location accessed in the book, the last query executed for the book, and the number of documents in the book which satisfied the query. The research apparatus displays this information on the display in response to an input from the input means. The display further indicates which of the books selected for the project is the current book. In response to another input from the input means, the user can select one of the books as the current book. Thereupon, the processing means causes the display to display a portion of the text of the new current book which includes the last location accessed.

The non-volatile storage may be either local storage which is directly accessible to the processor or remote storage which is accessible by means of a communications link. When a book in remote storage is selected by a project as the current book, the processor automatically accesses that book by means of the communication ink.

The research apparatus further includes library information for each book presently accessible to the research apparatus. A user working on a project may select a book to be used in his project by means of an input to which the processing means responds by using information from the library information for the book to make the desk top information for the book.

The book storage further includes an ordered document list for each stored book which specifies documents in the stored book. The processor responds to an input from the input means by displaying a portion of the document list for the current book. Moreover, when the processor is displaying a portion of the current book, the processor responds to inputs indicating movements in the current book which are relative to the current location but which are outside the document containing the current location by moving to the relative location as determined by the order of the documents in the document list. In some cases, the book storage includes specifiers for one or more alternate orders for the document list. The processor responds to a user input selecting one of the alternate orders by displaying the document list and moving in the book as specified by the alternate order.

The book storage for some books further contains search information for the book which can be used to run a query on the book. When a user inputs a query to the research apparatus, the processing means executes the query on the search information and makes a subset document list of documents which has the same order as the document list, but contains only those documents which satisfy the query. The subset document list may be displayed in the same manner as the document list and governs relative movement in the displayed text of the current book in the same fashion.

Whenever a query is executed for a project, the processor automatically adds the text of the executed query to the project state. In response to an input from the user, the processor causes the display to display the queries executed thus far. If the user selects one of the queries, the processor causes the display to display the selected query and edit the query in response to further user inputs. In response to another input, the processor executes the edited query. Additionally, the book storage may further include a published query list of queries for a book. The published query list is provided by the publisher of the book. The list may be displayed and a query selected therefrom and edited as just described for the queries belonging to project state.

Whenever the display is displaying text from a book and a user provides an input which does not specify a location in a book relative to the current location, the processor automatically pushes state needed to restore the display at the current location onto a stack in the project state. In response to another input, the processor pops the state on the top of the stack and uses the popped state to restore the display.

The project state further includes a notebook which contains information in an editable format. In response to an input, the processor displays the notebook, and by providing other inputs, the user can copy text from a book to the notebook and edit the contents of the notebook.

In conclusion, a book may contain a reference to information at another location in that book or another book. Each reference includes one or more location specifiers specifying a book and a location for the information in the book. When the processor is displaying the text of a book and an input specifies that references are to be displayed, the processor indicates in the display which text has references. In response to another input, the processor displays the referenced information. It does so by first determining whether any location specifier indicates that the information is located in the current book. If so, it displays that location in the current book. If not, it determines whether any location specifier indicates that the information is located in a book for which there is desk top information. If it is, the processor makes that book the current book and displays the location. If not, the processor determines whether any location specifier specifies that the information is located in a book for which there is library information. If there is, the processor makes desk top information for the book, makes the book the current book, and displays the location. Moreover, if the processor has a choice between a location specifier specifying a local book and one specifying a remote book, the processor makes the local book the current book and displays the text of that book.

It is thus an object of the invention to provide an improved research apparatus.

It is another object of the invention to provide research apparatus in which research may be easily performed for different projects.

It is a further object of the present invention to provide research apparatus which automatically maintains certain state for each project.

It is another object of the present invention to provide research apparatus which permits a user to perform research on both local and remote books.

It is a still further object of the present invention to provide research apparatus permitting viewing of documents in different orders.

Other objects and advantages of the present invention will be understood by those of ordinary skill in the art after referring to the detailed description of a preferred embodiment and the drawing, wherein:

BRIEF DESCRIPTION OF THE DRAWINGS

FIG. 1 is an overview of the hardware of the present invention;

FIG. 2 is a state diagram which is a functional overview of the present invention;

FIG. 3 shows the function and navigation keys in the present invention;

FIG. 4 is the command bar and pull-down menu which appears in response to the MENU key;

FIG. 5 shows screens for the entry state;

FIG. 6 shows screens for the utility state;

FIG. 7 shows screens for the utility state;

FIG. 8 shows substates of the list managers state;

FIG. 9 shows screens for the project list manager state;

FIG. 10 shows screens for the desk top list manager state;

FIG. 11 shows the screen for the library list manager state;

FIG. 12 shows the screen for the document list manager state;

FIG. 13 shows screens in the bookview state;

FIG. 14 shows screens in the bookview state;

FIG. 15 shows screens in the bookview state;

FIG. 16 shows screens in the query manager state;

FIG. 17 shows screens in the query manager state;

FIG. 18 shows the screen for the notebook manager state;

FIG. 19 shows the top-level structure of the programs for the invention;

FIG. 20 shows the structure of list manager low-level routines;

FIG. 21 is an overview of the contents of an optical disk used in the invention;

FIG. 22 is a detail of view files in the optical disk;

FIG. 23 an overview of the documents file in the optical disk;

FIG. 24 is a detail of the document text in the optical disk; and

FIG. 25 is a detail of the per project CBAM lists in a preferred embodiment.

DETAILED DESCRIPTION OF A PREFERRED EMBODIMENT

The following Detailed Description of a Preferred Embodiment will first describe the hardware environment in which the preferred embodiment of the professional research system operates, and will then provide a functional overview of the professional research system, a detailed description of the user interface to the professional research system, and a detailed description of the implementation of the professional research system.

1. The Hardware Environment — FIG. 1

The hardware environment in which a preferred embodiment of the professional research system operates is shown in FIG. 1. The primary component of the environment are personal computer (PC) 101, terminal (TERM) 103, magnetic disk drive (MDD) 109, optical disk drive (ODD) 111, modem 113, communications link (COM LINK) 115, and on-line data base (OLDB) 117. Personal computer 101 may be any computer. In a preferred embodiment, personal computer 101 is one of the class of personal computers which are adapted to execute the MSDOS operating system, for example, the PC 240, 280, and 380 computers manufactured by Wang Laboratories, Inc.

Personal computer 101 has two main components, memory (MEM) 102, in which data and programs are stored, and processing unit (PU) 100, which executes the programs and operates on the data in accordance therewith. The user interface to personal computer 101 is provided by terminal 103, which has a display (DISP) 105 and a keyboard (KB) 107. Display 105 operates under control of PU 100 to display data output from memory 102. The user of personal computer 101 may input data to personal computer 101 by means of keyboard 107. In the preferred embodiment, the user controls the professional research system by responding to information on display 105 by inputting keystrokes from KB 107 to indicate what the professional research system is to do next. In other embodiments, inputs may come from a pointing device such as a mouse in addition to keyboard 107.

In the professional research system's environment, personal computer 101 is equipped with data storage and communications peripherals. Additionally, personal computer 101 may be equipped with a printer and a floppy disk drive (not shown). The data storage peripherals include magnetic disk drive 109, on which data is stored on a magnetic medium, and optical disk drive 111, on which data is stored on an optical medium. Magnetic disk drive 109 is supplied as part of the Wang personal computers employed in a preferred embodiment and optical disk drive 111 in a preferred embodiment is manufactured by Toshiba. In both drives, the data is stored in files, and data is accessed by accessing the file which contains it. The data stored on magnetic disk drive 109 is readable and writable, i.e., personal computer 101 may both read and modify the data. The data stored on optical disk drive 111 is read only, i.e., personal computer 101 may read it but not modify it.

The communications peripheral is modem 113, by means of which personal computer 101 may exchange data over a communications link such as a telephone line with another computer system. In the preferred embodiment, the other computer system has an on line data base 117, and personal computer 101 may read items from on line data base 117 via com link 115. In the presently preferred embodiment, optical disk drive 111 and on line data base 117 together make up book storage 119 and contain the read-only books accessed by the professional research system. Book storage 119 is further divided into local book storage 121, made up of optical disk drive 111, and remote book storage 123, made up of on line data base 117 and the communications equipment required to access it remotely. Other embodiments may permit users to make their own books, and these user books would be stored on writable media such as magnetic disk drive 109. Magnetic disk drive 109 further serves as user storage (US) 125. As such, it contains the lists the user employs to select documents from books and the user's notebook.

As will be apparent from the following discussion, user storage 125 and book storage 119 may be implemented by any combination of local and remote devices and read-write, read only, or write once-read many media which provides the functionality required by the professional research system.

2. Functional Overview of the Professional Research System: FIG. 2

FIG. 2 presents a functional overview of the professional research system. The professional research system appears to its users as a set of states. The state that the user is presently in determines what operations he can perform. The performance of an operation has as a state transition as its result. The state transition may be to another state or to the same state. In FIG. 2, states are represented by circles and transitions between states by curved arrows. An arrow which returns to the state it left indicates a transition to the same state. In the professional research system, different types of reference information and user information are associated with different states. Reference information 233 is represented by oblongs with curved ends; user information 235 is represented by squares. Straight arrows connecting reference information 233 or user information 235 to a state indicate the flow of data between the information and the state. The direction of the arrow indicates whether the state merely reads the information, merely writes the information, or does both.

The functional overview of FIG. 2 is related to the hardware environment of FIG. 1 a follows: there is associated with each state one or more screens which are displayed on DISP 105. By inputting keystrokes from KB 107 in response to the screen the user causes personal computer 101 to execute a program which carries out the transition to the next state. Transitions may be brought about by depressing program function keys as specified in the screen, by selecting items from lists, by selecting from pull down menus which appear in response to a MENU key, or by filling in fields in the screen and striking an EXECUTE key. In a preferred embodiment, reference information 233 is read-only information which is provided by a publisher to the user of the professional research system. Reference information 233 resides on optical disk drive 111 or is retrieved from on-line data base 117. User information 235 is information such as document lists, queries, and a notebook which the user employs to perform research on the reference information. As is implied from the above, user information 235 is writable and is stored on magnetic disk drive 109. In other embodiments, users may be able to define their own reference information 233. Such user-defined reference information would be stored on media which were at least write once and the professional research system would include devices for reading and writing such media.

In a presently preferred embodiment, the following reference information 235 may be obtained from reference sources such as the optical disks used in optical disc drive 111 or on-line data base 117:

Reference Text (RT) 225, which is the text of the reference books available from the reference source.

Reference library list (RLL) 233, which is a catalog of the reference books available from the source.

Reference document list (RDL) 208, which is a catalog of the documents which make up the books in the source A document is a publisher defined subdivision of a book such as an article, a chapter, or in the case of legal reporters, a case.

Reference search information (RSI) 223, which is the information which the query portion of the professional research system uses to search the text in reference text 225.

Reference query list (RQL) 227, which is a list of queries provided by the publisher of the reference source for use in researching the source. Not every reference source will have a reference query list.

The user information includes information which the user derives from the reference information, information which is provided entirely by the user, and information which is a combination of both:

Library list (LL) 205 is a list derived from reference library lists 202 of reference sources accessible to the professional research system which has entries for all books currently available to users of the professional research system. An entry for a book on the list contains all of the information required by the professional research system to access the book.

Project list (PROJL) 205 lists all of the research projects currently in progress on the professional research system. All research done on the professional research system is carried out within a project. Each project has its own list of books, lists of documents, list of queries, and notebook.

Desk top list (DTL) 211 for each project lists the books from library list 205 which are currently being used by the project. Information for a project's DTL 211 comes from library list 205. A user of the professional research system selects a single book from desk top list 211 as the current book.

Full document list (FDL) 213 for each project is a list of all of the documents in the current book. The information in FDL 213 comes from RDL 208 for the book.

Subset Document List (SDL) 217 for each project is a list of documents which satisfy a query run on the current book. The list is made by omitting the documents from FDL 213 which do not satisfy the query but otherwise keeping the documents in the same order as on FDL 213.

Published query list (PUBQL) 220 for each project is a list of queries provided by the publisher for the current book. The queries are obtained from reference query list 207. If there are no published queries, this list will not exist.

Project query list (PQL) 221 for each project is a list of queries used thus far in the project. The queries are made by the user, but the user may run or modify a query from published query list 220. The queries are run using the information in reference search information 223.

Notebook (NB) 229 for each project is a word processing document in which a user can write notes or to which the user can copy portions of the text of a document. Notebook 229 can further be edited or copied like any other word processing document.

In the presently-preferred embodiment, library list 205 for books in local book storage 1210 project list 209, desk top lists 211, and project query lists 221 all contain information which is particular to a given professional research system or project and is retained from one use of the professional research system to the next. In particular, the desk top list 211 and project query list 221 for a project contain project state which is automatically saved by the professional research system when a user ceases work on a project and is automatically restored by the professional research system when the user resumes work on a project. A user of the professional research system may thus cease work on a project and later resume work at exactly the point at which he left off work.

Since library list 205, project list 209, desk top lists 211, and project query lists 221 must be both non volatile and easily accessible, they are maintained in a preferred embodiment in CBAM (compressed B-tree access method) files on magnetic disk drive 109. Each entry in a list is a record in the list's CBAM file, and mappings and inverted lists in the file permit rapid accesses to the entries by means of various keys.

Other lists are generated as needed and maintained in buffers in memory 102. Included in these lists are library lists 205 for books in remote book storage 123 and full document list 213, subset document list 217, and published query list 220 for the current book. Library lists 205 for remote books are generated when the user selects an on-line library from information in on-line data base 117. Full document list 213 and subset document list 217 are generated when needed for the current book using reference document list 208 for the current book and information in the current book's desk top list entry which specifies the last query run on the book. Published query list 220 is generated when needed from reference document list 208. In other embodiments, these lists, too, may be maintained in files in magnetic disk drive 109.

The states are the following:

ENTRY 201 is the first state entered from MSDOS. From there, the user may transition to UTIL 203 or LMS 207.

Utilities (UTIL) 203 is the state entered by a user who wishes to add a book to library list 205 or redefine the manner in which personal computer 101 may be connected to on-line data base 227.

List manager state (LMS) 201 is the state entered by a user who wishes to use the user lists to add or select a project from project list 209, add a book from library list 205 to desk top list 211, select a current book from desk top list 211, or select a document from full document list 213 for the current book.

Query manager (QM) state 215 is the state a user enters who wishes to run a query on the current book. The user may select a query from project query list 221, modify a selected query, or make a new query. When the specified query is run, the documents which satisfy the query are listed in subset document list 217.

Bookview (BV) state 219 is the state a user enters who wishes to read the text of a current document selected from full document list 213 or subset document list 217. The user may move forward and backward in the selected document at will, may move from one location which satisfies a query to the next, and may move from one appearance of a term to the next. The user may also move forward to the next document or backward to the preceding document in the list from which the current document was selected. Further, the user may copy a portion of the current document to notebook 229.

Notebook manager (NM) state 231 is the state a user enters who wishes to work on notebook 229.

As may be seen from FIG. 2, transitions are possible between ENTRY 201 and UTIL 203 or LMS 207, between LMS 207 and QM 215 or BV 219, and between QM 215 and BV 219. Additionally, transitions are possible between LMS 207, QM 215, or BV 219 and NM 231 and from any state to MSDOS. Two keys may be used for transitions in any state: the professional research system responds to the CANCEL key by going back to the state which preceded the present state and to the EXIT key by returning to ENTRY state 201.

3. Overview of Operation of the Professional Research System

The following example of how a user might operate the professional research system presumes that the user has already established a project and selected books for it. When the user enters the ENTRY state from MSDOS, he can go to utilities state 203 or list manager state 207. Presuming the latter case, in list manager state 207, the user is presented with a display on display 105 of the list of projects presently stored in project list 209. The user selects one of the projects, and in response to that selection, the user is presented with a display of current desk top list 211 for the project. The user selects one of the books from current desk top list 211 as the current book and in response to the selection, the professional research system enters bookview state 219 and displays the last location read in the book. If the user wishes to select a different document, he specifies that he wishes to view full document list 211 for the current book. When he selects a document from that list, the professional research system enters bookview state 219 and displays the first page of the selected document. From desk top list 211 or bookview state 219, the user can enter query manager 215 and compose a query which query manager 215 runs using reference search information 223 for the current book to produce subset document list 217 consisting of documents from the book which satisfy the query. A document may be selected from subset document list 217 as described for full document list 213, but in this case, when bookview state 219 is entered, bookview state 219 displays the first place in the selected document at which the query is satisfied.

Once the user is in bookview state 219, he can use keys on KB 107 to navigate in the displayed text. Kinds of navigation include browsing by reading preceding or following pages, going to pages which may be specified either by a label such as a number or by position relative to the current page, going to the next or previous place in the document where the query is satisfied, or scanning for a specified text string. The user can further select either full document list 213 or subset document list 217 for navigation purposes. In the former case, when the navigation goes beyond the bounds of the current document, the next or previous document in full document list 217, depending on the direction of navigation, becomes the current document. In the latter case, the next or previous document on subset document list 217 becomes the current document. A publisher of reference material may specify more than one way in which a book's documents are ordered in the document list, and the user may select the order which is most convenient for his purposes. A publisher may thus use alternate orders to provide different users with different paths through the material contained in the book. For example, a publisher of a legal reporter ma specify an order which presents the cases contained in the reporter in the order in which they appear in the printed recorder, may specify a chronological order in which the oldest case appears first, and may specify a reverse chronological order in which the youngest case appears first.

As will be explained in more detail below, a document may contain a reference to another document in the same or a different book. While in bookview state 219, the user may go to the referenced document. Additionally, a document may have a "see also" section provided by the publisher. The "see also" section indicates other documents that are not referenced in the given document but may be of interest to the reader of the given document. When a user specifies "see also" in bookview state, a list of references to the other documents appears and the user may go to one of the references in the manner just described. Besides permitting the user to read and navigate in a document, bookview state 219 permits the user to print a portion of a document on a printer accessible to the professional research system and to copy a portion of a document to notebook 229. In the course of the copy operation, the professional research system performs a transition to notebook manager state 231.

The user can further transition to notebook manager state 231 without performing a copy operation. Such transitions are allowed from list manager state 207, query manager state 215, or bookview state 219. Once in notebook manager state 231, the user can write and edit his own text or edit any material copied from documents to notebook 229, can copy material from notebook 229 to other documents or text files, and can print all or part of the material in notebook 229. By striking the CANCEL key while in notebook manager state 231, the user can return to the state from which he entered notebook manager state 231.

The books on library list 205 and desk top list 237 may be either local, i.e., stored on storage media such as optical disks in optical disk drive 111 which are immediately accessible to personal computer 101, or remote, i.e., stored on a computer system accessible via com link 115, as is on line data base 117. When a user performs an action which requires information from on line data base 117, such as adding a remote book to desk top list 211, running a query on a remote book, or selecting a remote book for viewing, personal computer 101 automatically connects itself to the computer system on which on line data base 117 is stored and fetches the necessary information from on line data base 117. There is thus no distinction from the user's point of view between information stored on locally-available optical disks and information stored on on-line data base 117.

4. Features of the User Interface to the Professional Research System which are Common to All States: FIGS. 3 and 4

Before entering into a detailed discussion of the states of the professional research system, the Detailed Description will present two aspects of the user interface of the professional research system which are common to all states: the function keys of keyboard 107 and the command bar and menus which appear when the MENU function key of keyboard 107 is struck.

4.a. Keyboard 107: FIG. 3

Keyboard 107 is a standard typewriter keyboard which has in addition a number of function keys for specifying transitions between states and operations within states and navigation keys for navigating in documents, lists, and the notebook. The function and navigation keys are arranged around the standard keyboard. FIG. 3 shows these function and navigation keys in a preferred embodiment.

Beginning with function keys 301, there are 16 such keys. As with other keys on the keyboard, certain of the function keys have one function when the shift key is not depressed with the function key and another function when the shift key is so depressed. In FIG. 3, such function keys have two labels and the top label indicates the function of the key when the shift key is depressed. In overview, the function keys have the following functions:

A. Function Keys Which work in Any State:
  HELP 303: gives the user context-dependent help information.
  MENU 305: presents the user with a context-dependent command bar with pull-down menus.
  EXIT 339: permits the user to return to ENTRY state 201 from any other state.
  CANCEL 341: The user employs CANCEL key 341 to abandon a given state and return to the state from which the given state was entered and within a state to abandon an action in the state.
B. Function Keys which Perform Transitions to New States
  EXEC 348 in navigation keys 343: When a transition to a new state requires a user to select from a list or enter information, the user initiates the transition by striking EXEC after he has made his selection or entered the information.
  SEARCH BOOK 311: permits a user who is in the desktop substate of LMS state 207 or bookview state 219 to transition directly to query manager state 215.
  GOTO DOCLIST 327: if the user is in the substate of list manager state 207 which manages desk top list 211 or in bookview 219, the function key transitions the user to a substate of list manager state 207 which manages document list permits the user to immediately view either full document list 213 or subset document list 217, depending on which was selected by full/subset key 313.
  NTBK/MOVE 325: in states in which the user does not edit text, NTBK/move 325 transitions the user to notebook manager 231; in states in which he does, the function key specifies the MOVE editing operation.
C. Function Keys which work in the BOOKVIEW state:
  GO BACK 307: restores the context of the BOOKVIEW state which preceded the present context thereof.
  GOTO REF 315: permits the user in bookview state 219 to choose a reference in the current document, retrieves the document referred to in the reference for the user, and places him at the location in the retrieved document specified in the reference.
  SEE ALSO 317: presents the current document's list of see also references to the user. The user can then select a reference from the see also references as described above for GO TO REFERENCE 315.

FULL/SUBSET 313: toggles the user in bookview state 219 to toggle between full document list 213 and subset document list 217 as the source of documents to be viewed.

SCAN 321: if the user is in bookview state 219, scan 321 permits the user to specify a text string to be searched for in the text. Bookview state 219 then shows the user the next location of the text string in the current book.

GOTO DOC 329: when the user is in bookview 219, this key combined with navigation keys 343 permits the user to go to the previous or following document or to the beginning or end of the previous document.

PREV TERM 331, NEXT TERM 333: when the user has run a query on the book and is in bookview state 219, these keys move the user to the previous or the next location in the book which satisfies the query.

D. Function Key employed in Query Manager State 215

RECALL 319: if the user is in query manager state 215, recall 319 permits the user to recall the last query used in the project, the last query used in the current book, or to select a query to be recalled from a list of all of the queries used in the project.

E. Other Function Keys

GOTO PAGE 337: when the user is viewing a document, list, or notebook, he can specify a page and move to it by striking this key.

GET BOOK 309: permits a user who is in query manager state 215, bookview state 219, and a substate of LMS state 207 which manages the desk top list to specify a book by name and make that book the current book without leaving the state in which the function key is pressed. The professional research system automatically takes all actions required to make the new book the current book.

COPY 323: if the user is in bookview state 219, copy 323 permits the user to copy a portion of the current document to notebook 229 or to a printer; if the user is in notebook state 231, copy 323 permits him to copy material from one portion of the notebook to the next.

PRINT 335: In bookview state 219, the key permits the user to print a portion of the current document on a printer connected to PC 101; in notebook manager state 231, it permits the user to print a portion of the notebook.

As can be seen from the above description, the function keys permit the user to get from one state of the professional research system to another and to operate within a state easily and efficiently.

Continuing with navigation keys 343, these keys include EXEC key 348, which is actually one of the function keys and is described above. PREV 345, NEXT 347, and the direction keys 349 are used to navigate when a document is being read in bookview state 219 or in screens requiring user input. In bookview state 219, PREV 345 and NEXT 347 get the previous and next pages of the current document respectively. If there is not previous or next page, the keys get the last page of the preceding document or the first page of the following document respectively. Each stroke of the up and down direction keys 349 cause the screen to scroll up or down one line respectively; each stroke of the left and right direction keys 349 cause the current line to scroll one character to the left or right respectively, up to a maximum of 40 characters. In notebook manager state 231 and when a list is being viewed, PREV 345 and NEXT 347 cause the display to display the next page of the notebook or list. When the user is writing in notebook 229, writing a query, or filling in a field, the direction keys move the cursor in the direction indicated by the key.

4.b. The Command Bar and the Pull-Down Menus presented in response to MENU Key 305: FIG. 4

The top line of the screens for the states of the professional research system are reserved for the command bar. The command bar includes headers for a number of menus. When the user presses MENU key 305 in any of the states of the professional research system, the command bar becomes active and the user may select an item from any of the menus. Which set of menus are offered to the use and what items appear on those menus depends on the state the professional research system is in when the user presses MENU key 305; however, the command bar and the menus have the general form shown in FIG. 4 for all states, and the same keys are used in all states to select a menu and an item from the menu.

FIG. 4 shows the command bar for screens in bookview state 219. Contained in command bar 401 are menu headers 403, which indicate which menus the user may select from. Once the user has pressed MENU key 305, he can employ keys on the keyboard to move to the left or right on the command bar. When the user moves to a menu header 403, the menu header 403 is highlighted and the menu 407 for that header appears below the menu header. Only the menu for the presently selected header is displayed. In FIG. 4, the menu associated with the Search menu header is displayed. The menu contains a list of items 407, which in the case of the Search menu, offer the user the choice of searching the book using a query, scanning the book using a text string, or clearing the query. By means of other keys on the keyboard, the user can move a selection bar, represented by italic type in FIG. 4, up and down the list of items. The item presently selected has an arrow 411 to the left of it. When the user has made his selection, he strikes EXEC key 348, the professional research system does the selected function, the menu disappears, and the command bar becomes inactive. If the user decides he does not want to make a selection from the menus, he strikes cancel key 341, the menu disappears, and the command bar becomes inactive.

In the presently preferred embodiment, the user may move to the right among menu headers 403 by using the tab key on the keyboard or the right direction key 347 and may move to the left by using the backtab key on the keyboard or left direction key 347. The distinction between the keys is that movement in response to the right and left direction keys stop at the last headers on the menu bar, while movement in response to tab continues from the last header to the first and movement in response to backtab continues from the first to the last. The user may move selection bar 409 up among menu items 407 by means of the backspace key or the up direction key 347 and down by mean of the space bar or the down direction key 347. Both sets of keys operate in a circular fashion when they reach the end of the list. Additionally, a user may type the first letter of a menu item 407 to cause selection bar 409 to move immediately to that item.

In a preferred embodiment, when a user enters a state and strikes MENU key 305 for the first time in that state, the leftmost menu header 403 is automatically selected and that header 403's menu 407 displayed. From then on, as long as the user stays in the state, header 403 is selected when the user hits MENU key 305 which was last selected by the user and with the menu 406 for that header displayed. The use of MENU key 305 to activate command bar 403 and the us of keyboard keys to navigate across command bar 403 and within menus 405 gives users of the professional research system the ease of use and flexibility typical of menu systems used with pointing devices, but without the need to permanently devote a part of display 105 to menus and without the need to move the hand from the keyboard to the pointing device in order to make a menu selection. Moreover, as can be seen from FIG. 4, the user can generally perform the same actions using menu picks and EXEC key 348 as he can with the function keys. The combination of command bar 401 and menus 405 with the function keys thus offer the less skilled user who has not yet learned the function keys an easy interface to the professional research system without interfering with the skilled user who no longer requires menus.

5. Detailed Description of the States of the Professional Research System: Figs.

The following discussion of the states of the professional research system will discuss the functions performed by each state, the transitions from the state, and the user interface for the state in detail.

5.a: ENTRY State 201: FIG. 5

As may be seen from FIG. 2, ENTRY state 201 is the first state entered by the user of the professional research system. FIG. 5 shows the screens which appear on display 105 in that state. When the user commands MSDOS to execute the professional research system program, boot screen 501 appears and remains while MSDOS is loading the professional research system program and data from files on magnetic disk drive 109 into memory 102 of personal computer 101. When loading is complete, entry menu 503 appears. When the use selects either the first or second entries in the menu and hits EXEC key 348, the professional research system performs a transition to the project list manager substate of list manager state 207; when the user selects the third entry, the professional research system performs a transition to utilities state 203. If the user hits CANCEL key 341, the professional research system returns to MSDOS.

5.b. Utilities State 203: FIGS. 6 and 7

When the user selects "Utilities" from entry menu 503 and hits EXEC key 348, the menu shown in FIG. 6 appears. As shown by the menu, the user can perform three actions in utilities state 203: install an optical disk on ODD 111, remove a book from library list 205, and modify the manner in which personal computer 101 connects itself via com link 115 to the system containing on line data base 117. If the user selects "modify connections," he can interact with a set of screens to modify a file in magnetic disk drive 109 from which personal computer 101 determines how it is to effect a connection to on line data base 117.

As shown in FIG. 7, if the user selects "Install a CD ROM", install screens 703 and 705 appear. Screen 705 indicates to the user that he must place an optical disk in optical disk drive 111, and after the user has done so, screen 701 provides him with an abstract 703 of the installed disk which utilities 203 reads from the optical disk. When the disk is installed, the information about the disk's books in reference library list 233 on the disk is automatically added to library list 205. The information about the books on the disk remains in library list 205 even after the optical disk is removed from optical disk drive 111.

Once a book has been added to library list 205, it may be removed only by selecting "remove a book" on main utilities menu 601. When the user does so, remove book screen 707 appears. That screen displays CD-ROM library list 709, listing all of the books on optical disks which are presently on library list 205. The user selects one or more of the books from list 709, and these books are removed from library list 205. To select more than one book, the user employs INSERT key 351. When a user who is in until state 203 performs the last action in that state, or when he hits the cancel key, he is returned to entry state 201.

5.c. List Manager State 207: Figs.

The discussion of list manager state 207 will begin with an overview of the substates of that state and will then provide a detailed description of each of the substates.

5.c.a: Overview of the Substates of List Manager State 207: FIG. 8

List manager state 207 in a preferred embodiment consists of four substates. Those substates and the user lists and reference lists they are associated with are shown in overview in FIG. 8:

Project list manager (PLM) 801 manages the list of projects currently being done in the professional research system, which is kept in project lists 209. The user may make transitions between project list manager 801 and entry state 201 and desk top list manager state 805.

Desk top list manager (DTLM) 805 manages each project's desk top list 211, which contains the list of books currently being used by the project. Research in a book begins with the selection of the book as the current book in desk top list manager 805, and thus there are transitions to and from project list manager 801, to entry 201, to and from library list manager 803, to and from document list manager 807, and to and from query manager 215, notebook manager 231, and bookview 219.

Library list manager (LLM) 803 manages library list 205, the list of all books presently available to the professional research system. Transitions are to and from notebook manager 231 and desk top list manager 805.

Document list manager (DLM) 807 manages the document lists for a project. It obtains information from reference document list 208 for the current book and generates s full document list 213 from that information. After a search, it generates subset document list 217. Transitions are to and from desk top list manager 807, bookview 219, and notebook manager 231.

As may be seen from the foregoing description, library list manager substate 803, desktop list manager substate 805, and document list manager 807 are of fundamental importance to a central feature of the user interface for the professional research system: that it presents electronically-accessible information in a manner similar to that in which books are presented to a user in the library. Library list 205 is analogous to the library's catalog, desk top list 211 is analogous to the set of books presently on the user's desk, and the document lists are analogous to the tables of contents of those books.

5.c.b. Detailed Description of Project List Manager State 801

As previously pointed out, users of the professional research system perform all their research within projects. Each project has its own desk top list 211, its own project query list 221, and its own notebook 229. When a user stops working on a project, the lists and notebook for the project are saved on magnetic disk drive 109. Further, when a user references materials on line data base 117 in the preferred embodiment, the owner of on line data base 117 identifies and bills the user by project name. In project list manager state 801, the user can select a project to work on, can select a project to be deleted or archived, can edit information about the project, and can restore an archived project.

Screens for project list manager state 801 are shown in FIG. 9. As described in the discussion of entry state 201, a user enters project list manager state 501 by selecting one of two items on entry memo 503. If he selects "Existing Project," project list screen 901 appears unless there is only one project on the list. In that case, the professional research system moves directly to list managers state 207. Screen 901 displays a project list 911 of presently available projects. If the user selects one of the projects from the list and strikes EXEC key 348, a transition to desk top list manager 805 is made and desk top list 211 for that project appears. If the user wishes to perform some other operation on a project, he strikes MENU key 305. The menus that appear at action bar 401 offer the following possibilities:

| Action menu: | Start new project |
| | Delete a project |
| | Edit project info |
| | Go to page |
| Misc menu: | Exit |
| Utility: | Archive a project |
| | Retrieve a project |

Selection of "Go to page" and "Exit" from the menus has the same effect as striking the function keys of the same names. If "Delete a project" is selected, the project which the user has selected from project list 911 is deleted. When a project is deleted, its desk top list 211, project query list 221, and notebook 229 are also deleted. Consequently, when a user specifies deletion, delete project dialog box 915 appears to warn him of the consequences of his act. In order to actually perform the deletion, the user must strike EXEC key 348.

If "Edit project info" is selected, edit project information screen 919 appears with the project name and project description for the selected project and the user can edit name and description. If "Archive a project" is selected, a series of screens take the user through the steps of using the floppy disk drive to make a copy of the project information, desk top list 211, project query list 221, and notebook 229 for the selected project on one or more magnetic diskettes. If "Retrieve a project" is selected, the user specifies the disk drive which has the diskette containing the project to be retrieved and the project is retrieved. If a project of the same name already exists, the user is asked whether the existing project is to be overwritten before retrieval occurs. If "Start new project" is selected, start new project screen 917 appears and the user enters the project name and information. When he is finished, he strikes EXEC 348, an empty desk top list 211, an empty notebook 229, and an empty project query list 221 are created for the project, and the project is added to project list 911.

Project list screen 901 is typical for the list screens which are displayed by the substates of list manager state 207. As previously indicated, the top line of the screen is action bar 401 with menu headers 403. On the next line is found list name 905, which indicates which list is being displayed. List size 903 indicates how many pages and items there are to the list. Prompt 907 indicates how the user is to interact with the screen. List header 909 provided titles for the columns of the list. List 911 follows the list header and is divided into columns 913. In the case of the project list, the information for the items on the list is provided by the user; in the cases of library list 205, desk top list 211, full document list 213, and subset document list 217, the information is provided by the publisher of the reference book. In the latter cases, both form and content of the information is determined by the publisher.

Which item in a list has been selected is indicated by a selection bar and an arrow, as in a menu 405. The same keys are used to move the selection bar as in menu 405. In addition, PREV 345 moves the user back to the previous screen of a list requiring more than one screen and NEXT moves the user forward to the next screen of such a list, and GOTO PAGE key 337 permits the user to move to a specified screen of the list. In some lists, the user can employ INSERT key 351 to select more than one item from the list. Once the action to be taken and the list items it is to be taken on have been specified, the user executes the action by striking EXEC key 348.

5.c.c. Detailed description of Desktop List Manager State 805: FIG. 10

Desktop list manager state 805 is the state in which a user selects a book to be viewed from desk top list 211 for the project in which the user is currently working. The entry for each book in desk top list 211 includes the last document and last location therein which the user accessed in the book and the last query which the user ran on the book. In addition, desk top list manager state 805 keeps track of which book on desk top list 211 is the current book and saves that information when the user leaves the professional research system.

FIG. 10 shows the screens which appear to the user in desk top list manager state 805. Desk top list screen 1001 is the screen which appears when the user enters desk top list manager state 805. As a list screen, screen 1001 generally resembles project list screen 401 and the same keys are used for navigation and selection The following differences are noteworthy:

Project Name 1003 indicates the project to which the desk top list belongs.

black ball 1005 preceding the second item on the list indicates that the book is an on line book, i.e., is stored in on-line data base 117 instead of on optical disk drive 111.

Last Document column 1007 indicates the name of the last document read in the book.

Last Query column 1009 indicates the last query run on the book.

When desk top list screen 1001 appears on display 1005, the selection bar indicates current book 1011. The first book on the list in screen 1001, titled Training Book, is a book supplied with the system which the user may use for training purposes. If there are no books in desk top list 211, empty desktop list dialog box 1015 appears instead of the list of books.

To select a book to view, the user moves the selection bar to the desired entry on the desktop list and strikes EXEC key 348. The professional research system then establishes the selected book as the current book, constructs full document list 213 from reference document list 205 for the book, makes the transition to bookview state 219, and there displays the last location read in the current book. As will be explained in more detail later, the professional research system saves subset document list 217 for the current book and the immediately preceding current book; if the new current book selected by the user is neither of these, no subset list dialog box 1013 appears on desk top list screen 1001 before the transition is made to bookview. The user may choose to either restore the subset list or open the book immediately. In response to the first choice, the professional research system restores subset list 217 by running the last query saved for the book in desk top list 211 on the book and proceeding to bookview state 219; in response to the second, the professional research system simply proceeds to bookview state 219 as described above.

If the user strikes MENU key 305, the following menus appear on desktop list screen 1001:

| | |
|---|---|
| Action: | Shelve Book |
| | Go to Page |
| | Get Book |
| Libraries: | CD-ROM |
| | CD-ROM UPDATE |
| | WESTLAW |
| Misc: | Connect/Disconnect |
| | Exit |
| | Open Notebook |
| | Change Project |

When the user selects the "Action menu" and then "Shelve book" and selects a book from desk top list screen 1001, the selected book is removed from desk top list 211. By using INSERT key 351, the user may select more than one book to be removed. Go to Page and the corresponding function key permit the user to move to a different page of desk top list 211.

Get Book and the corresponding function key permit the user to make any book on a library list 205 the current book. In response to the function key or the menu pick, the professional research system requests short title 1105 of the book. When the user then presses EXEC key 348, the professional research system takes any action required to make the specified book the current book. At a minimum, the professional research system replaces the current full document list 213 with a new full document list 213 for the referenced book. If the book is not on the project's desk top list, the professional research system adds the book to the desk top list. Moreover, if the book is listed on library list 205, but the optical disk containing the book is not presently mounted on optical disk drive 111, the professional research system requests the user to mount the disk; similarly, if the book is a remote book, a communication link is established with on-line data base 117.

The "Libraries" menu permits the user to specify a library from which he wishes to select a new book. In the preferred embodiment, both CD ROM Update and WESTLAW are remote libraries stored on line data base 117. CD ROM update contains current updates of the books in the user's CD-ROM library and functions as an electronic equivalent of the "pocket parts" found in legal reference materials. When the user makes a selection and strikes EXEC key 348, a transition to library list manager 803 occurs.

The "Misc" menu permits the user to specify that the professional research system establish or disestablish a connection to on line data base 117 or specify a transition to Entry state 201 ("Exit"), to notebook manager state 231 ("Open Notebook"), or to project list manager state 801 ("Change Project"). A user may also perform the former transitions by means of EXIT key 339 or NTBK/MOVE key 325 respectively. Two other function keys are active in desktop list manager state 805: SEARCH BOOK key 311 and GOTO DOCLIST key 327. When the former key is pressed, a transition to query manager state 315 occurs; when the later key is pressed, a transition to document list manager 807 occurs.

5.c.d. Detailed Description of Library List Manager State 803: FIG. 11

In library list manager state 803, the user can select books for a project desk top list 211 from one or more library lists 205. Entry to list manager state 803 is by means of a selection from the "Libraries" menu in desk top list manager 805. As previously mentioned, in a preferred embodiment, there are three library lists 205: the CD ROM library list is a list of books stored on
 optical disks which are available to the given professional research system.
the WESTLAW library list and the CD ROM Update list are lists of books stored in on line data base 117. As previously mentioned, the information on CD-ROM library list 205 is copied from reference library list 202 on an optical disk when an optical disk is installed for the first time on the professional research system and remains on CD ROM library list 205 until a user removes it by performing the remove book action in utility state 203. The information on WESTLAW library list 205 and CD-ROM update list 205 is obtained from on line data base 117 when a user selects either of those libraries.

On entry into library list manager state 803, library list screen 1101 for the selected library, shown in FIG. 11, appears. Library list screen 1101 is a standard list screen, and differs from those previously disclosed in the following respects: library title field 1103 indicates which library list 205 is being displayed. The list itself has four columns. Column 1105 gives a short name for the book. Users may employ the short name together with GET BOOK function key 309 or the equivalent function key to get a book without selecting it from desk top list 211. Column 1107 gives the book's title; column 1109 gives the publisher; column 1111 gives the publisher's number for the optical disk containing the book. This column is left blank when the WESTLAW or CD-ROM Update lists are being displayed. When the selection bar is placed at an entry in the list and EXEC key 348 is struck, the selected book is added to the project's desk top list 211.

Library list screen has menus accessible by MENU key 305 as follows:

| | |
|---|---|
| Action: | Go To Page |
| Libraries: | CD-ROM |
| | CD-ROM Updates |
| | WESTLAW |
| Misc: | Open Notebook |
| | Exit |

Selection of Go To Page, Open Notebook, and Exit are equivalent to striking the GO TO PAGE, NTBK/MOVE, and EXIT function keys; in the "Libraries" menu, selecting a library list 205 other than the one presently being displayed causes that list to be displayed.

5.c.e. Detailed Description of Document List Manager State 805: FIG. 12

In document list manager state 805, the user of the professional research system selects a document from a list of the documents in the current book. Transitions to document list manager state 805 are from desk top list manager state 805 and bookview state 219 and are accomplished by striking GOTO DOCLIST key 327 in either of those states or selecting "Go to doc list" from the "Action" menu in bookview state 219.

FIG. 12 shows the screen which appears when the user enters document list manager state 807. Document list screen 1201 is a standard list screen but has the following items of particular interest: book title 1203 identifies the book the documents on the list belong to; as in desk top list 211, black ball 1205 indicates that the book is an on line book; list type 1207 indicates whether the list being displayed is full document list 213 or subset document list 217; and query text 211 indicates the last query run on the book. As previously explained, when the list being displayed is subset document list 217, only those document which contain locations satisfying the query are on the list; when the list being displayed is full document list 213, entries on screen 1201 for documents satisfying the query are highlighted.

As previously mentioned, a publisher of a book may specify more than one order for the documents in the document list. Alternative orders are specified in reference document list 208. Order indicator 1209 indicates which of the orders is presently being used. The term "published order" in the preferred embodiment indicates that the document appear on the list in the same order as in the equivalent hard copy book. The column headings and columns in the actual document list are determined by the publisher of the book; in screen 1201, the first column contains citation 1215, a short specification of the document used to cite it in legal writings; the second column contains title 1215 of the document; the third column 1217 specifies the number of pages in the document.

Selection of an item in the displayed list in document list screen 1201 is the same as for list screens generally; when the user selects the item and strikes EXEC key 348, the professional research system makes the transition to bookview state 219 and displays the first page of the indicated document. When the user strikes MENU key 305, the following menus become available:

| | |
|---|---|
| Action: | Go to page |
| | Search book |
| | Reorder list |
| | Get book |
| | Switch to (SUBSET) |

| | |
|---|---|
| | -continued |
| | (FULL) |
| Misc: | Go to Desktop |
| | Go to Bookview |
| | Open Notebook |
| | Exit |

In the menus, "Go to page", "Search book", "Get Book", "Open Notebook", and "Exit" have the same effects as GOTO PAGE key 337, SEARCH BOOK key 322, GET BOOK key 309, NTBK/MOVE key 325, and EXIT key 339 respectively, and each of those keys may be used instead of the menu pick. "Go to Desktop" and "Go to Bookview" take the user to desktop list manager state 807 and bookview state 219 respectively. "Switch to (SUBSET)", like FULL/SUBSET key 313 permit the user to toggle back and forth between subset document list 217 and full document list 213. When the user toggles from one list to the other, the list displayed on document list screen 1201 changes accordingly. When the user selects "reorder list", finally, a menu appears on document list screen 1201 which shows the use what orders are available for the document list and permits him to select one. If the user selects a new order, the professional research system rebuilds full document list 213 and subset document list 217 according to the new order and changes the display on document list screen 1201 accordingly.

5.d. Detailed Description of Bookview State 219: FIGS. 13-15

The detailed description of bookview state 219 includes an overview of the state and detailed descriptions of bookview screens, of navigation within a screen, and of the menus for the bookview screens.

5.d.a. Overview of Bookview State 219

Bookview state 219 is the state in which the text of a document contained in the current book is displayed on display 205. In the case of a document from a local book, a preferred embodiment retrieves the text from an optical disk in optical disk drive 111; in the case of a document from a remote book, the preferred embodiment retrieves the text via modem 113 and com link 115 from on line data base 117. Entry into bookview state 219 is from desk top list manager state 805 or document list manager state 807. In the former case, when the user selects a book from desk top list 211 as the current book and strikes EXEC key 348, bookview state 219 displays either the last location which the project accessed in the selected book or the first page of the first document in the selected book; in the latter, when the user selects a document from document list 213 or 217 and strikes EXEC key 348, bookview state 219 displays the first page of the selected document. When the user is finished in bookview state 219, CANCEL key 341 returns him to desk top list manager state 805.

Once in bookview state 219, the user can read documents in the current book in the order in which the documents occur in full document list 213 or if there is a subset document list 217, in the order in which they occur on subset document list 217. From a given point in a document, a user can move forward and backward relative to his current position. The relative movement may be within a document or to documents adjacent to the document containing the current position on whichever document list is selected. There are three modes of relative movement: browse mode, search mode, and scan mode. In browse mode, the user can move to the top or bottom of the current page, to a page which is specified relative to the current page, to the beginning or end of the current document, to the beginning or end of the preceding or following document, or to the first or last document in the current list. After running a query on a book, a user can use search mode, to move forwards and backwards from one term which satisfies the current query to another term which satisfies the query. In scan mode, finally, a user can specify a string of characters to be searched for and can move forwards and backwards from one occurrence of the string of characters to the next. In the preferred embodiment, some books permit all three modes of relative movement; others permit searching only, and still others do not permit searching. No queries may be run on books of the last type, and consequently, no subset document list 217 will exist.

The user may specify the following non relative moves in bookview state 219: to a named page within the present book by means of GO TO PAGE key 337 or an equivalent menu pick, to a different book by means of GET BOOK key 309 or an equivalent menu pick, or to a location specified in an embedded reference in the text currently being displayed by means of GO TO REF key 315 or an equivalent menu pick. An embedded reference is a reference to a location in another document in the same book or a different book. In bookview state 219, the user can specify a reference in the text displayed on screen 105 and bookview state 219 will automatically go to the specified location if the document is contained in a book on library list 205. The book containing the referenced location becomes the current book, and full document list 213 becomes the current document list. If the book is on library list 205 but not on desk top list 211 for the project, the professional research system will automatically add the book to desk top list 211. Further, if the book is a remote book and there is presently no connection to on line data base 117, the professional research system will automatically establish the connection. References also appear in SEE ALSO pages provided by publishers for certain documents. These references are of interest to the reader but are not part of the text. By means of SEE ALSO key 317 or an equivalent menu pick, the user can command the professional research system to display the SEE ALSO page for the document, and can then go to any of the references on the page. Bookview state 219 also provides a GOBACK function, activated by GOBACK key 307 or an equivalent menu pick, which permits the user to return to certain previously-displayed locations.

5.d.b. Bookview Screens: FIG. 13

When the user enters bookview state 219, a bookview screen appears. FIG. 13 shows one such bookview screen, QUERY screen 1301. This screen appears whenever a user has run a query on the book being displayed. The following features of QUERY screen 1301 are general to all bookview screens which display text:

Command bar 401 works the same way as it does in list screens.

Title line 1302 contains book title 1303 of the book from which text is being displayed and document title 1311, which in this case is the citation for the text being displayed. If the book is an on line book, title 1303 will be preceded by a black ball and if the book is search only or not searchable, book title 1303 is followed by SO and NS respectively.

Field 1305 gives the page of the book being displayed.

Field 1313 gives the document page being displayed and the total number of pages in the document.

Screen 1301 is displaying the beginning of the document, and consequently includes document header 1315, which contains the document's full title.

In all bookview screens, the user can navigate within the screen, from screen to screen, from document to document, and from book to book. Additionally, the user can scan from one occurrence of a text string to another. If the current book is not a search only book, the user can further navigate from page to page of the book, and if the book is searchable, the user can navigate from one query term 1317 to the next. In all cases but navigation by book page name, the order in which documents are displayed is determined by full document list 213 or subset document list 217, depending on whether the user is in FULL or SUBSET mode.

The following keys are used to navigate within a screen and from screen to screen:

Direction keys 349 cause the displayed text to scroll up, down, left, and right.

NEXT key 347 causes the next screen of text to be displayed.

PREV key 345 causes the previous screen of text to be displayed.

GO TO DOC key 329 and an equivalent menu pick are used to navigate from document to document. When the user presses the key, a prompt appears asking for a document specification. The user provides the specification by striking another key and hits EXEC key 348, and bookview 219 displays a screen of the specified document. The keys which specify a document are NEXT key 347 and PREV key 349 and up and down direction keys 347. NEXT key 347 and PREV key 349 respectively specify the beginning of the next or previous document on the relevant document list. Up direction key 347 specifies the first screen of the current document and down direction key 347 displays the last screen of the current document. GET BOOK key 309 and an equivalent menu pick are used as previously described to navigate from book to book. When GET BOOK is specified in bookview state 219, the last location read in the book is displayed.

SCAN key 321 and an equivalent menu pick are used to navigate from one occurrence of a text string to the next. When the user presses the key, a prompt appears asking for the text string. The user supplies the text string and presses EXEC key 348 or NEXT key 347, the professional research system scans through the documents on the current document list for the next occurrence of the specified text string. When the next occurrence is found, a screen bookview screen containing the occurrence is displayed with the occurrence highlighted. To scan the other direction, the user presses PREV key 345 instead of NEXT key 347 or EXEC key 348. To stop scanning, the user presses CANCEL key 341. In response, the prompt with the text string appears and the user can either edit the text string and resume the scan or again strike cancel key 341, which ends the scan. When text is displayed during the scan operation, only occurrences of the scan string are highlighted. A particular advantage of SCAN mode is that a user can scan a book for an item which interests him without having to formulate a query.

GO TO PAGE key 337 and an equivalent menu pick are used to navigate from page to page in books where that is permitted. When the user presses the key, a prompt requesting a page specification appears. The user provides the specification and hits EXEC key 348, and the specified page is displayed. The page specification can specify the top or bottom of the current page, the preceding or following page in the book, the first or last page of the current document, a page within the current document relative to the current page, and any page within the current book. To specify the top or bottom of the current page, the user employs up and down direction keys 349 to specify the top and bottom lines of the current page; to specify the previous or following page in the book, the user employs PREV key 331 and NEXT key 333 respectively; to specify the first or last page of the current document, the user employs the shift key together with up and down direction keys 349; to specify a page within the current document relative to the current page, the user employs a number prefixed with + or − to indicate the relative location; To specify any page in the current book, the user employs the book page name specified in field 1305 and the desired page number. When bookview state 219 is in subset mode and the next or previous page is not in the current document, the new page is from the next or previous document as determined by subset document list 217; if the book page specified with the book page name is not in one of the documents on subset document list 217, bookview state 219 switches to full mode, and field 1307 is changed accordingly.

5.d.c. Special Bookview Screens: FIGS. 13-15

Aspects of QUERY screen 1301 specific to that type of bookview screen include full/subset indicator 1307, which indicates whether full document list 213 or subset document list 217 is determining the sequence in which bookview state 219 displays documents, query result position indicator 1309, which indicates how many results the query had in the book and which result of that number is presently displayed, and query term 1317, which is a term in the document which satisfies the query. As suggested by the bold face type in FIG. 13, query term 1317 is highlighted in a preferred embodiment. The user may navigate from one query term 1317 to the next by means of PREV TERM key 331, NEXT TERM key 333, and equivalent menu picks. PREV TERM key 331 takes the reader to preceding occurrence of query term 1315 and NEXT TERM key 333 takes the reader to the following occurrence.

If no query has been run on the current book, the screen shown in FIG. 14 is displayed on display 105. Header 1304 of no query screen 1403 has no full/subset indicator 1307 or result position indicator 1309. Moreover, no query terms 1317 are highlighted. No query screen 1401 further shows how document pages and the end of a document are indicated in all bookview text screens. End of page indicator 1403 indicates the end of a page of a document, and end of document indicator 1405 indicates the end of the document.

FIG. 15, finally, shows the bookview screens which are displayed in connection with the GOTO REF and SEE ALSO functions. GO TO REF screen 1501 is displayed when the user presses GO TO REF key 315 or makes an equivalent menu pick. References 1505 to other documents which are embedded in the text currently being displayed are highlighted and the first of the references 1505 is displayed in reverse video. Using direction keys 349 or the space bar and the backspace key, the user can move the reverse video backwards and forwards from one reference to the next in the display. When the user has thus selected the desired reference, he presses EXEC key 348 and the professional research system displays the text in bookview mode at the location specified in the reference. If the reference is to another book, that book becomes the current book. The professional research system automatically performs any actions necessary to make the book the current book in the same fashion as described for GET BOOK key 309 and the corresponding menu pick.

SEE ALSO screen 1507 is displayed when the user presses SEE ALSO key 317 or makes an equivalent menu pick in bookview state 219. The screen displays a see also page which the book's publisher provides for the document and which is visible only when see also key 317 is struck. The page contains a list of see also references 1509 for the document. The user selects one of these references in the same fashion as he selects a reference on GOTO REF screen 1501, the book specified in the reference becomes the current book as described above, and the portion of the reference relevant to the document to which the see also page belongs is displayed.

5.d.e. Bookview Menus

As may be seen from FIG. 13, a user in bookview state 219 may select from Action, Search, Browse, Copy, and Misc menus. The Action menu offers the following choices:

| Action: | Go to reference |
|---|---|
| | Display see also |
| | Scan book |
| | Go back |
| | Go to doc list |
| | Go to page |
| | Go to document |
| | Get book |

With the exception of Go back and Go to doc list, these menu selections correspond to function keys whose actions have already been discussed in detail. The professional research system responds to a selection of Go to doc list and to the corresponding function key by performing a transition to document list manager state 807.

When the user presses GO BACK function key 307 or selects Go back from the Action menu bookview state 219 displays the previous bookview screen for which bookview information was saved. Bookview information is simply the information required by bookview state 219 to resume displaying text at a specified location and to respond to the function keys and menu picks in the same fashion as when the text was originally displayed.

After bookview state 219 has restored a display in response to GO BACK, but before it has made the restored bookview information the current bookview information, bookview state 219 provides a prompt which instructs the user to press CANCEL key 341 if he wishes to undo the GO BACK. If the user presses CANCEL key 341, he is returned to the screen being displayed when he hit GO BACK; if he presses any other key, bookview state 219 makes the restored bookview information into the current bookview information and continues displaying the restored screen. In a preferred embodiment, bookview state 219 saves bookview information each time the user performs a move which is not relative to the location in the book currently being displayed by bookview state 219. Such non relative moves in a preferred embodiment include leaving bookview state 219, performing the GET BOOK operation, or specifying a named page in the GO TO PAGE operation. The professional research system maintains a stack of records for up to 30 saves of bookview information for a project, and by repeated use of GO BACK, the user can work down the stack to restore any of the 30 displays.

The Search menu has the following selections:

| Search: | Find WESTLAW doc |
| --- | --- |
| | Clear query |
| | Search book |

When the user selects "Find WESTLAW doc", the professional research system requests a short title for a document in a book in the WESTLAW library of remote books. When the user provides the title and strikes EXEC key 348, the professional research system responds in the same fashion as if the specified document had been a reference selected by the user after striking GOTO REF key 315. When the user selects "Clear query", the professional research system ceases highlighting query terms, deletes subset document list 217, and returns to FULL viewing mode. The selection of "Search book, finally, causes a transition to query manager state 215.

The Browse menu has the following selections:

| Browse: | First document |
| --- | --- |
| | Last document |
| | Next page |
| | Previous page |
| | Top of page |
| | Bottom of page |
| | Next document |
| | Previous document |
| | Top of document |
| | Bottom of document |
| | Next query term |
| | Previous query term |

These selections have the same effect as the corresponding function keys and navigation keys.

The Copy menu is the same as the one which appears when COPY key 323 is struck. The user indicates by his selection from the menu whether he wants to copy to a printer connected to personal computer 101 or to notebook 229. The user employs the navigation techniques already discussed to specify the portion of the current book he wishes to copy. The specified portion is highlighted, and when he strikes EXEC key 348, it is copied to the printer or to notebook 229. When the copy is to notebook 229, the professional research system includes a citation and a copyright notice for the portion of text being copied and gives the copied portion of text the same format as it has when displayed in bookview state 219. On completion of the copy, the professional research system performs a transition to notebook manager state 231.

The Misc menu has the following selections:

| Misc: | Open notebook |
| --- | --- |
| | Return to desktop |
| | Exit |
| | Switch to (SUBSET)(FULL) |

Selection of one of these options has the same effect as striking the corresponding function key or, in the case of "Return to desktop", Cancel key 341.

As may be seen from the foregoing, a particular advantage of bookview state 219 is the wide range of navigation possibilities it offers the user. The user can view a document without formulating a query, can read the document sequentially, as he would in a book, can skip from page to page, can move from document to document, can move from one location which satisfies a query to the next, can move from one occurrence of a text string to the next, can immediately follow up on a reference, and can immediately turn to another book. Moreover, it makes no difference to the user whether the book is on optical disk drive 111 or stored in on line data base 117 The user thus has a flexibility which beyond what has heretofore been available in document reading systems.

5.e. Detailed Description of Query Manager State 215: FIGS. 16 and 17

Query manager state 215 is the state in which a user of the professional research system formulates and executes a query on the current book. When the query has been executed, the query manager state constructs a subset document list 217 containing the documents from the current book which satisfy the terms of the query and returns the user to bookview state 217. Bookview state 217 is in SUBSET mode and displays QUERY screen 1301 for the first location in the first document of subset document list 217 which satisfies the query.

Entry to query manager state 215 is by means of SEARCH BOOK function key or the corresponding menu pick from desk top list manager state 805 or bookview sate 219. As shown in FIG. 16, on entry into query manager state 215, the professional research system displays query formulating screen 1601, upon which the user formulates a query. Like other professional research system screens, screen 1601 has command bar 401. In the header, book name field 1603 displays the name of the current book; state identifier field 1605 indicates that the user is searching a book, and prompt field 1607 indicates that he is to enter the query.

Using his keyboard, the user enters a query in query entry window 1609. In the preferred embodiment, the user may edit the entered query by moving the cursor to the desired point in query entry window 1609 and performing editing functions such as insertion, deletion, copying, or overwriting. The query may be in any query language which is interpretable by the professional research system. A preferred embodiment employs the query language developed by West Publishing Co. for its WESTLAW (TM) on-line legal research system. That language and the manner in which it is used in legal research are explained in detail in *WESTLAW Reference Manual*, West Publishing Co., 1982, which is hereby incorporated by reference into the present application. When the user is satisfied with the query, he strikes EXEC key 348 to execute the query and return to bookview state 219. To return to the state from which he entered query manager state 215 without executing the query, the user strikes CANCEL key 341.

The menus from which the user may select on query formulating screen 1601 are the following:

| Action: | Show/remove assists |
| --- | --- |
| | Erase query |
| | Get book |
| Recall: | Last query in proj |
| | Last query in book |
| | All project queries |
| Misc: | Open Notebook |
| | Go to Desktop |
| | Go to Bookview |
| | Exit |

When the user selects "Show/remove assists" in the "Action" menu, assists window 1611 appears below query entry window 1609. The window contains a short summary of the WESTLAW query language. On selection of "Erase query", the current contents of query entry window 1609 following the current cursor position are erased. "Get book" and the function key of the same name, finally, operate to make a book specified by the user the current book while remaining in query manager state 215.

The "Recall" menu and RECALL key 319 permit the user to retrieve a previously-used query and automatically insert it at the current cursor position in query entry window 1609. On pressing RECALL key 319, a menu appears which offers the same choices as the "Recall" menu. If the user selects "last query in proj" and pushes EXEC 348, the last query used in the project is recalled; if he selects "Last query in book", the last query used in the book is recalled.

If he selects "All project queries" the screen shown in FIG. 17 appears. Query list screen 1701 is a list screen like those previously described which lists all of the queries executed for a project thus far. The columns in the list include query text column 1703, containing text for each query, book name column 1709, which indicates the book's name and, by means of the black ball, whether it is local or remote, and docs column 1705, which indicates the number of documents in the book satisfying the query. The user selects a query from the list as previously described for list screens. In other embodiments, the "Recall" menu may have a fourth entry permitting the user to select a query from reference query list 227 provided by the publisher in the same manner as from project query list 221. RECALL function key 319 and the "Recall" menu make an important contribution to the ease of use of the professional research system, since they permit the user to formulate queries with a minimum of typing and to widen or narrow a promising search by simply recalling the query for the search and deleting terms from it or adding terms to it.

The "Misc" menu, finally, provides for transitions to other states. In response to "Open notebook", the professional research system performs a transition to notebook manager state 231; in response to "Go to desktop", it performs a transition to desk top list manager state 805; in response to "Go to Bookview", it performs a transition to bookview state 219; in response to "Exit" or EXIT key 339, it performs a transition to entry state 201.

5f. Detailed Description of Notebook Manager State 231: FIG. 18

Notebook manager state 231 manages notebooks 229. Each project in the professional research system has a notebook 229, and users can read, write, edit, and print text from notebook 229 in the same fashion as they can read, write, edit, and print text using a word processing system. In addition, as described in the discussion of bookview state 219, users can copy text from a document being displayed in bookview 219 to notebook 229, and can edit the copied text. In a preferred embodiment, notebook 229 is a word processing document of the type used in the WP+ word processing system manufactured by Wang Laboratories, Inc. and notebook manager state 231 uses components of the WP+ word processing system to manipulate notebook 229. The WP+ word processing system is described in U.S. Pat. No. 4,633,430, Cooper, *Control Structure for a Document Processing System*, issued Dec. 30, 1986, and incorporated herein by reference.

Transition to notebook manager state 231 may occur from any state other than entry state 201, utilities state 203, project list manager state 801, and notebook manager state 231 itself. The transition is by means of NTBK/MOVE key 325 and equivalent menu selections and by means of a "Copy to notebook" menu selection in bookview state 219. When CANCEL key 341 terminates editing in notebook manager state 231, the professional research system performs a transition back to the state from which notebook manager state 231 was entered.

FIG. 18 shows notebook screen 1801 which is displayed when a user enters notebook manager state 231. Like other professional research system screens, notebook manager screen 1801 has a command bar 401. Following the command bar in the header are project name 1803, notebook manager state indicator 1805, notebook position indicator 1807, and format line 1809, indicating the display format of that portion of the notebook. The remainder of the screen is occupied by notebook text 1811. Page marker 1813 indicates where a page of notebook text 1811 ends. In a preferred embodiment, the user may manipulate notebook text 1811 by using the keyboard and function keys in the same manner as described in *WP Plus Release 2 Reference Guide*, 2nd edition, Wang Laboratories, Inc., 1986 which is incorporated herein by reference.

The menu available in notebook manager state 231 are the following:

| Copy | To printer |
| --- | --- |
| | To WP document |
| | To text file |
| | To WITA |
| Misc | Erase notebook |
| | Exit |

In the "Copy" menu, the text to be copied is selected as described above for "Copy to notebook". "To printer" is self explanatory; "To WP Document" copies the selected text to a WP+ document outside the professional research system; "To text file" converts the selected text to the form required for a MSDOS text file and copies the converted text to such a file; "To WITA converts the selected text to the form required for the Wang Information Transfer Architecture, an intermediate document structure used in Wang Laboratories, Inc. systems.

In the Misc menu, the professional research system responds to the selection of "Exit" or the corresponding function key by performing a transition to entry state 201 and to selection of "Erase notebook" by deleting the entire contents of notebook 229. Before doing so, the professional research system presents the user with a dialog box warning him of the consequences and requesting confirmation.

As can be seen from the foregoing, notebook manager 231 is fully integrated into the professional management system and notebook 229 is accessible from any state the user enters after he has chosen a product. In addition, the user can do the same things with notebook 229 as he can with a word processing document. These facts taken together make the professional research system particularly useful for researchers whose job is to not only find material, but also to analyze it, to comment on it, and to use it to prepare new documents.

6. Details of the Implementation of the Professional Research System in a Preferred Embodiment: FIGS. 19-25

The detailed description of the preferred embodiment of the professional research system now turns to certain characteristic details of the implementation of the preferred embodiment. The discussion will begin with the overall structure of the professional research system software, will continue with a discussion of the information formats used in the optical disk, and will conclude with a discussion of the implementation of lists in a preferred embodiment.

6.a. Structure of Professional Research System Software: FIGS. 19 and 20

The software for the professional research system is made up of a large set of routines. One routine may invoke another and may provide information to and receive information from the invoked routine. The following will first describe the high-level structure of the professional research system software and its correspondence to the system's states and will then describe the structure of the list management software as an example of the low level structure of the professional research system.

FIG. 19 shows the top level structure of the professional research system. The circles in the figure indicate routines, and an arrow pointing from one routine to another indicates that the routine which is the source of the arrow invokes the routine which is the destination of the arrow. The top level structure consists of a switch routine (SW) 1901 and routines which correspond to each of the states as follows:

| Routine Name | State |
| --- | --- |
| Entry routine (ER) 1903 | Entry 201 |
| Utility routine (UR) 1905 | Utility 203 |
| Project list routine (PLR) 1907 | Project List 801 |
| Desk top list routine (DTLR) 1909 | Desk Top List 805 |
| Library list routine (LLR) 1911 | Library List 803 |
| Document list routine (DLR) 1913 | Document list 807 |
| Bookview routine (BVR) 1915 | Bookview 219 |
| Query routine (QR) 1917 | Query 215 |
| Notebook routine (NR) 1919 | Notebook 231 |

Each of the routines which corresponds to a state further invokes lower-level routines 1921.

Operation of the top level structure is as follows: when a user enters the professional research system, he enters switch routine 1901, which operates as an endless loop to switch the professional research system from one state to another until the user exits the system. Each time the user specifies a state change, the routine corresponding to the state he is presently in returns control to switch 1901 and at the same time provides switch 1901 with the information it needs to invoke the routine corresponding to the new state specified by the user. For example, on entry from MSDOS, switch 1901 invokes entry routine 1903; if the user selects utility state 203, entry routine 1903 provides switch 1901 with that information and returns to switch 1901, which then invokes utility routine 1905. When the user is finished in utility state 203, utility routine 1905 returns information to switch 1901 which causes switch 1901 to invoke entry routine 1905. If the user then selects project list manager state 801, entry routine 1905 returns that information to switch 1901, which invokes project list routine 1907. Other state transitions are managed in the same fashion.

The routines corresponding to the states also operate as infinite loops: as long as the user input specifies an action within the state, the state routine performs the action and waits for the next input. However, if the user input specifies a state transition, the state routine returns to switch 1901. While operating, each state routine invokes a large number of lower level routines 1921 to perform the functions of the state. FIG. 20 provides an example of the structure of these lower level routines. Shown in FIG. 20 is the structure of the lower level routines 1921 for document list manager state 805. The same structure is employed for the other list states PLM 801, LLM 803, and DLM 807 and in query manager state 215 to manage the query lists. Structures for other states will be generally similar to those for the list states, but will differ as required for the functions of the other states.

In FIG. 20, each circle represents one or more routines at a given level of the structure. There are four levels: specific list function level 2001 contains the routines which carry out the specific functions of desk top list manager 805; in order to carry out these functions, the routines at level 2001 invoke routines at generic list function level 2003. These routines, which are used by routines at level 2001 for all of the list states, fall into three groups: list display functions 2011 perform the functions necessary to display list screens. List utilities functions 2013 are functions that are used not only by list states, but also by states such as query manager 215 which require information about a list. For example, query manager 215 uses functions from LUF 2013 to determine the current query for the current book. List manager manager functions 2015 perform the actual functions specified by a user in making a selection from the list. In many cases, of course, the function will involve a state transition and consequently a return to document table list routine 1909 and switch 1901.

List display functions 2011 and list utility functions 2013 invoke routines at the next level, system library level 2005. These routines are routines which belong to libraries of high-level system primitives provided by Wang Laboratories, Inc. MENU functions (MENUF) 2017 is a set of routines for displaying menus and returning use input provided in response to the displays; system library functions 2019 provide memory and high-level file management functions. List manager functions 2015 invokes routines at system primitive level 2007. The routines at this level deal with the media upon which information is stored: optical disk functions 2021 read reference information employed on lists from the optical disk in optical disk drive 111; remote functions 2025 do the same with regard to reference information obtained from on-line data base 117; file functions 2023 read and write the CBAM files in which the lists are stored in magnetic disk drive 109.

6.b. Overview of Optical Disks for the Professional Research System: FIG. 21

The optical disks used in optical disk drive 111 are standard CD-ROM disks employing the High Sierra format. The layout of the information on the CD ROM disks used in the professional research system is shown in overview in FIG. 21. In that Figure, optical disk 2101 is represented as a column of data, beginning ag the center of optical disk 2101 and ending at the outer edge. The column is logically divided into 328,500 logical blocks (LB) 2103, each one of which contains 2048 bytes. In the professional research system, the logical blocks are used in a directory system permitting location of files on optical disk 2101 and in the files themselves.

The components of the directory system are volume descriptor 2105, path table 2107, alternate path table 2121, and directories 2109. Volume descriptor 2105 contains information about the volume of information contained on optical disk 2101. Among other things, the information uniquely identifies the volume by means of a unique volume set number and a volume number specifying the volumne's position in the set, the location and size of path table 2107 and alternate path table 2121, the location of the root directory in directories 2109, unique identifiers for the volume set the volume belongs to, the publisher, the data preparer for the volume, the application the volume is intended for, time of volume creation, and if required, the time at which the volume was last modified, the time at which it expires, and the time at which it becomes effective.

Each file on optical disk 2101 belongs to a named directory. A given directory may contain files and/or other directories. If a directory contains other directories, that directory is the parent of the directories it contains. Path table 2107 contains a table entry for each directory on optical disk 2101. The information in the entry includes the directory name and permits location of the named directory in directories 2109 and location of the entry for the directory's parent in path table 2107. Alternate path table 2121 is a copy of path table 2107 which provides access to the directories in case the portion of optical disk 2101 containing path table 2107 is damaged.

Directories 2109 contains a file for each directory on optical disk 2101. The file for a given directory contains a directory entry for each file or directory belonging to the given directory. The information in the directory entry for a file includes the location of the file on optical disk 2101, the time and date of creation of the file, the type of the file, the file's number in the set of files in the set of volumes to which optical disk 2101 belongs, and the name of the file.

Search files 2111 contain the information which query manager 215 uses to carry out queries on the books contained in optical disk 2101. Search files 2111 thus represent an embodiment of reference search information 223 in optical disks. As previously indicated, remote books or books stored on magnetic disk drive 109 may have other forms of reference search information 223. In a preferred embodiment, each book on optical disk 2101 has a set of search files. Search files for every book include a dictionary of the words in the book, an index specifying the locations of each word in the dictionary in the book, and a character control file which contains character translation tables for translating the character codes used in the book to the character codes used in the professional research system. Using the dictionary file and the index file, query manager 215 can determine the location in the book being searched of every occurrence of the set of query terms defined on query formulating screen 1601 for the query. Query manager 215 places the locations in buffers in memory 102 of professional computer 101 which are accessible to bookview 219. Bookview 219 then uses the locations in the buffers to locate and display the portions of the book's text which contain the query terms.

The search files for a book may additionally include a query field menu file and a query field definition file. The query field menu file contains the list of query field names which appears in the FIELDS portion of assists window 1611 in query formulating screen 1601. The query field definition file contains an entry for each of the query field names. The entry for the name contains the components of the actual query which is used to find the information specified by the query field name.

View files 2113 contain the files used by bookview 219 to display the text, those used by document list manager 807 to make document lists 213 and 217, and those used by query manager 215 to make published query list 220. Each book on the optical disk has its own set of view files 2113. View files 2113 thus represent the embodiment for books on optical disks of reference text 225, reference document list 208, and reference query list 227. A detailed discussion of view files 2113 will follow the present overview of optical disk 2101.

Abstract file 2115 contains the text for the abstract of the contents of the volume which appears on screen 703 of utilities 203 when the optical disk containing the volume is installed on optical disk drive 111. Copyright file 2117 contains the copyright notice for the entire optical disk 2101.

Install file 2119 is the embodiment on optical disk 2101 of reference library list 233. It contains the information about the books contained in optical disk 2101 which is entered in library list 205 for the professional research system and desk top list 211 for each project. Install file 2119 is discussed in detail below.

6.c Install File 2119 Detail

Install file 2119 contains information about the volume contained on optical disk 2101 and each of the books in the volume. In a preferred embodiment of install file 2119, the following information is included for the volume:

The name used for the volume set in mount requests
A description of the volume
A count of the number of disks in the volume set
A count of the number of books in the volume.
An install message which appears on display 105 when installation of the volume is complete.

The remainder of install file 2119 is a set of records for each book in the volume. The record for a book includes the following information:

The type of the book, for example, whether it is a new or replacement book

The volume set id and volume id for the book. This information is used by GET BOOK to request the user to mount the disk containing the book when the disk is not presently in optical disk drive 111.

Identifiers for the book and its publisher. When the book identifier is concatenated with the volume and volume set identifier, the result is a unique book identifier.

A short book name, used in GET BOOK and in screens displaying document lists from the book, and a long book name.

A description of the book

The name of the publisher and the date of publication

Information needed by query manager 215 to correctly interpret the book's search files 2111.

The names of search files 2111 and view files 2113 for the book.

The number of alternate orders in which the book's document list may be displayed.

For each alternate order, the names of the files in view files 2113 which specify the alternate order.

When an optical disk is first used in a professional research system, all of the information from the install file regarding each book on the optical disk is copied into the book's entry in library list 205. The professional research system can then use the information not only to produce a display in library list manager state 803 showing the book's title, publisher, description, and so on, but also to determine what disk a book is on, to determine how to set up query manager 215 to perform queries on the book, and to determine the locations of the files needed to search the book, display it, and make the book's document list. When a user of the professional research system adds a book to his project's desk top list 211, desk top list manager 805 copies the volume set name, the book name, the book description, the publisher, and the book identifier into the desk top list entry for the book.

6.d Detailed Description of View Files 2113: FIG. 22

As mentioned above, view files 2113 are the files used by bookview 219 to display text and by query manager 213 and document list manager 807 to make full document list 213, subset document list 217, and published query list 220. View files 2213 thus correspond to reference query list 227, reference document list 208, and reference text 225. FIG. 22 shows the structure of view files 2113. Each book on optical disk 2101 has a set of book view files 2201 in view files 2113. In overview, the set of book view files consists of the following:

View attribute file 2203 contains formatting information for document lists 213 and 217.

Published query pointers 2205 and published query list 2207 together contain published query information 2208, the information required to construct PUBQL 220.

Page name file 2209 contains a three-level index by page name to each page in the book. The professional research system uses page name file 2209 to locate pages when the user presses GOTO PAGE key 337 or selects Go to page in the BROWSE menu and specifies a page name.

Prim-alt map 2211 and alternate order 2213 together contain alternate order information 2215 for one alternate order of full document list 213 and subset document list 217. There is a set of alternate order information 2215 for each of the possible alternate orders.

Primary order file 2217 indicates the order in which the documents are to appear in the document lists when no alternate order is specified.

Document ID file 2219 permits access to the data document's document list entry by the document's ID number. The professional research system uses the file to construct subset document list 217.

Document list data 2221 contains the actual data for the document list.

Documents file 2223 contains the text of the documents in the book.

Published query files 2208 and alternate order files 2215 may not exist for every book. In the following, the files used to generate full document list 213, i.e., document list data file 2221, view attribute file 2203, the files belonging to alternate order information 2215, and documents file 2223 will be explored in more detail.

6.e. Files used to Generate Full Document List 213

In a preferred embodiment, the contents and display format of the document list for a book are determined by the book's publisher. Document list data file 2221 contains the contents of the document list. The file is organized as a set of records, one record for each document. Each record contains a fixed number of fields of varying length. The only fields which must be in the record are a field which specifies the index of the record for the document text in documents file 2223 for the book, and fields which specify how the name of the document is to appear in the document list, on the book-view screen, and when text is copied from the document to notebook 229, and a field which specifies the location of the document's text in documents file 2223 and the length of the document. Some of the fields contain information which is always displayed in the document list entry for a document; others contain information which is displayed in an expanded document list entries. In some embodiments, users will be able to specify display of expanded document list entries by means of a selection from the menu provided with document list screen 1201. In others, a function key may be provided for this purpose.

The manner in which the records of document list data file 2221 are to be interpreted by document list manager 807 is determined by view attribute file 2203. The information in that file includes the following:

A count of the number of fields in the records of document list data file 2221.

A count of the number of documents in the book

The names of primary order file 2217 and any alternate order files 2215.

Copyright notices for display when a book is opened and for outputting when a portion of the book is printed or copied to notebook 229 or some other location.

A count of how many fields in the record of doc list data file 2221 are always to be displayed.

A specification for each field which is always displayed of how the field is to appear and which field in the document list data file record for the book contains the field's data.

A count of how many fields in the record are to be additionally displayed when an expanded display is specified.

A specification for each field which is to be additionally displayed of how the field is to appear and which field in the document list data file record for the book contains the field's data.

Specifications of which fields in the document list data file record indicate the location and length of the text in the documents file, contain the index of the record containing the document's text in documents file 2223, and contain the forms of the document name required for the document list, bookview screens, and the non-page number part of the citation which is provided when a portion of the document is copied to notebook 229.

Primary order file 2217 is simply a list in the order in which the document text is stored in documents file 2223 for the book of the locations of the records for the entries in document list data file 2221. Alternate order file 2213 for each alternate order is the same kind of list, except that the list is in the alternate order. Primary to alternate order map file 2211 for each alternate order maps the primary order onto the alternate order. The file consists of one record for each position in the document list, the positions being taken in order from first to last. The content of the record is a number which specifies the position in the primary order and in documents file 2223 of the document which occupies the position represented by the record in the alternate order. For example, if there are 50 documents in the book and the alternate order is the reverse of the primary order, the first record in primary to alternate order map file 2211 would have the value 50, the next would have the value 49, and so forth.

When a user selects a book to be the current book, either by selecting it from desk top list 211 or by specifying it using GET BOOK function key 309 or the equivalent menu selection in document list manager state 807, query manager state 215, or bookview state 219, the professional research system employs the information in document list data file 2221, view attribute file 2203, and primary order file 2217 to construct full document list 213. The contents of each entry in the document list comes from document list data file 2221, the manner in which the records are formatted is determined by view attribute file 2203, and the order of the entries in the file is determined by primary order file 2217.

As previously explained, a user can reorder the document list into one of the alternate orders by selecting "reorder list" from the menu on document list screen 1201. At that point, a pop up menu appears with a list of the alternate orders. When the user makes a selection from the menu and strikes EXEC key 348, document list manager 807 retrieves records from document data list file 2221 in the order specified by alternate order file 2213 for the given order and generates full document list 213 as previously described. In addition to making the proper document list, document list manager 807 makes a list of the indexes to the documents in the documents file which has the same order as the document list. When bookview 219 is operating in full mode, it uses the list to determine the sequence in which text is retrieved from the documents file for the book during sequential viewing operations.

Generation of subset document list 217 proceeds as follows: when query manager 215 executes a query, it produces a list of indexes into the documents file for the documents which satisfy the query terms. Query manager 215 then provides the list of indexes to document list manager 217, which uses it to generate subset document list 217. If the full document list is in primary order, document list manager 217 simply takes each index on the list of indexes, uses it to locate the record for the indexed document in primary order file 2217, uses that record to locate the record containing the data for the document in document list data file 2221, and uses view attribute file 2203 to generate the document list entry. If the full document list is in an alternate order, document list manager 217 uses primary alternate map to reorder the list of indexes in the alternate order and then proceeds as just described.

6.f. Detail of Documents File 2223: FIGS. 23 and 24

Documents file 2223 for a book contains the text of all the documents in the book. FIG. 23 presents an overview of that file. Documents file 2223 has one document entry 2301 for each document in the book. Each document entry 2301 has three major parts: target table 2303, page table 2313, and document text 2327.

Target table 2303 provides a means of establishing a relationship between logical identifiers of locations in the document text and the physical locations. By this means, logical identifiers may remain constant through various editions of the book and the portions of the professional research system which use the logical identifiers will work with any edition of the book. In a preferred embodiment, a location identified by a logical identifier is termed a target. Target count field 2307 gives the number of targets in the document; for each target, there is a target entry 2305, which contains target name 2309, the logical identifier for the target, and word number 2311, which specifies the location corresponding to the target identifier in the current document. An example of target use is to specify locations in the document referred to by embedded references in other documents.

Page table 2313 establishes a relationship between the actual pages of the document, the names of the pages, and the word numbers for the words on the pages. Last word number 2317 is the number of the last word in the document; page name length 2319 is the length of the page name, and page count 2321 is the number of pages in the document. There is a page entry 2313 for each page of the document and the index of page entry 2313 in the array of page entries corresponds to the number of the page to which it corresponds. Page entry 2323 has two fields: first word on page field 2323, which is the number in the document of the first word on the page, and page name field 2325, which is the name of the page. Thus, if the number of a page in a document is known, its page entry 2315 can be located and the name of the page and the number of the first word on the page can be determined. The number of the first word can in turn be used to determine whether the target specified by a given target entry is on a given page.

Document text 2327 is represented in a preferred embodiment by the document structure shown in FIG. 24. The document structure is closely related to the document structure used in the WP+ document processing system developed by Wang Laboratories, Inc. The document structure is made up of blocks 2405, each one of which has a number. The blocks form three classes of items in the document: document header 2401, document indexes 2407, and document components 2409. Document components 2409 are made up of chains of one or more text blocks 2425. Blocks in a chain are connected by forward and backward pointers, permitting movement along the chain in either direction. Each text block 2425 has a text portion (T) 2419, containing character codes representing the text characters, and an attribute portion (A) 2421 which contains attributes which indicate how the text is to be displayed or indicate a reference number for information which applies at a given location in text portion 2419.

Document header 2401 contains index table 2403, which includes a pointer to the first block 2405 in each of the document indexes 2407. In document text 2327, there are two such indexes page index 2411, by means of which a given page of the document may be located, and reference index 2415, by means of which components of the document referred to in the document text may be located. Depending on the size of the index, the index may contain more than one block and may have more than one level. A leaf node in page index 2411 contains page index entries 2413. Each page index entry 2413 relates a page number in the document to the number of the first block 2405 in the page. A leaf node in reference index 2415 contains reference index entries 2417, which relate reference numbers to the number of the first text block 2425 in the chain containing the information represented by the reference number. The entire text of the document is represented by a single text chain 2427. Each page of the document begins with a new text block 2425, and page index entry 2413 for that page contains the number of the first text block 2425 in the page.

As previously pointed out, notebook 229 is a WP+ document, and consequently has a structure like that of the document text. When the user performs the COPY TO NOTEBOOK operation, the text contained in the portion of text chain 2427 specified in the copy operation, together with a citation and a copyright notice, are copied to a chain of text blocks 2425 which are appended to the end of the equivalent of text chain 2427 in notebook 229. Chains referred to by references, such as ER INFO 2433 for an embedded reference, or See Also page 2423, are not copied. The user can then perform editing operations on the text chain in notebook 229.

As previously pointed out, the text of a document may contain embedded references. When a user of the professional research system employs GOTO REF key 315 to select a reference and then presses execute, the professional research system displays the location specified in the selected embedded reference. Embedded references are implemented in a preferred embodiment as follows: When a text block 2425 in text chain 2427 contains an embedded reference (ER) 2429 in text portion 2419, attribute portion 2421 contains a reference number for embedded reference 2429 at a location in attribute portion 2421 corresponding to the location of embedded reference 2429 in text portion 2419. There is a reference index entry 2417 for reference number 2431 in reference index 2425, and reference index entry 2417 contains the first text block 2425 of the chain containing embedded reference information 2433. In a preferred embodiment, ER INFO 2433 contains from one to four descriptions of locations of the text referred to in embedded reference 2429. The use of multiple location descriptions permits the professional reference system to deal with problems arising from the fact that the same document may be contained in several different books and will also be available in on line data base 117.

There are three kinds of location information: local location information, which is employed when the embedded reference is to a location in another document in the same book, other book location information, which is employed when the embedded reference is to a location in a document in another book, and on line-location information, which is employed when the embedded reference is to a location in on-line data base 117. Local location information consists of the following:
The identification number of the document
The target name for the location.

In this case, the professional research system uses the document identification number to locate document entry 2301 for the document in documents file 2223, uses the target name to locate target entry 2305 for the target, uses word number 2311 to determine the word location of the reference, and uses page entry 2315 to locate the document page containing the reference. The document becomes the new current document and bookview 219 displays the specified page.

When the location information specifies a document in another book, the information further includes a unique identifier for the book containing the document and the publisher's identifier for the book. In this case, the professional research system uses the book and publisher's identifiers to look for the book. The search begins with desk top list 211, and if the book is not there, continues with library list 205. If the book is on library list 205 but not mounted, the professional research system asks the user to mount the disk containing the book. If the book is available, it becomes the current book. When the location information is on line location information, it further includes an on-line identifier instead of the publisher's ID and the book ID. In this case, the professional research system establishes a connection via com link 115 with on line data base 117 and retrieves the text at the specified location. Again, the on-line book becomes the current book.

If the embedded reference is to a document in the same book as the document containing the embedded reference, ER INFO 2433 will contain only the local reference information; if the embedded reference is to a document in another book, ER INFO 2433 will contain one to three other book location descriptions for books containing the referenced document, and an on-line location description, for use when none of the books are on library list 205. The professional research system always attempts to find the reference in a book locally available to the professional research system before retrieving it from on-line data base 117. In some cases, of course, the referenced material is available only in on line data base 117, and in that case, ER INFO 2433 will contain only on-line location information.

In a preferred embodiment, the see also page is implemented as information located by means of a reference number and reference index 2415. The reference number for the see also page is contained in attribute part 2421 of the first text block 2425 in text chain 2427 for the document. When a user presses see also key 317 or makes the equivalent menu selection, the professional research system uses the reference number to locate the chain of text blocks 2423 for the see also page. These text blocks 2423 contain the text of the see also page and also contain reference numbers for ER INFO chains 2433 for the embedded references listed in see also page 2423. The reference numbers and ER INFO chains (not shown) are similar to those just described.

6.g. Detail of User Lists 235: FIG. 25

As previously mentioned, user lists 235 other than full document list 213, subset document list 217, and published query list 220 are stored in CBAM files. In a preferred embodiment, CBAM files are made up of U elements, each of which has two parts: a key, which is unique to the element in the file, may contain from 1 to 127 bytes, and is used by the CBAM file system to retrieve the U element, and a data part, which may contain 0 to 255 bytes of data. Each U element in a list has a field in the key which identifies the list the element belongs to. The lists in the preferred embodiment employ 3 kinds of U elements: data elements, mapping elements, and inverted elements. Another field in the key indicates which kind a given U element is.

The data elements contain the data for a list. There is one data element for each field of a list entry. The key portion of each data element has a record serial number which uniquely identifies the entry in the list to which the data element belongs and a field identifier which indicates the field in the entry which the data in the data element belongs to. The list specifier, the element type, the record serial number, and the field specifier together make up the data element's key. The mapping elements map entry sequence numbers to record serial numbers. When a list manager displays a list, it displays the list entries according to their order in the mapping element. The mapping thus permits rearrangement of the order in which the entries in a list are displayed by a list manager without any change in the keys of the data elements and also permits a list to be treated as a data structure such as a stack. In a preferred embodiment, when an entry is added to or deleted from a user list, the mapping element is altered so that the display of the list is reordered to take into account the addition or deletion.

Each inverted element is an element in an inverted list, i.e., a list which maps values of fields onto the record serial number for the list entry which contains that value. For example, in a preferred embodiment, one such inverted list in library list 205 maps a book's short title onto the record serial number for the book's entry in library list 205. The key for the inverted element contains the field identifier for the field and a value for the field which may be up to 124 bytes long. The data is the record serial number for the list entry containing the field value in the key.

In a preferred embodiment, the system user lists, namely library list 205, project list 209, and an internal volume list, are each contained in a separate CBAM file. The per-project user lists, namely desk top list 211 and project query list 221, for each project are contained in a single CBAM file for that project. Each list begins with a special element having record serial number 0 which contains internal data used by the relevant list manager to manage the list. In the following, the information contained in project list 209, library list 205, desk top list 211, and project query list will be described in detail. In each of these lists, some information is always displayed, other information is displayed only if the user requests an expanded list, and some information is never displayed.

Each entry in project list 209 contains fields for the project name and description provided by the user when the project is created and fields for the project's creation date and time, the date and time of last access to the project, the project's author the amount of time spent working on the project using PRS, the name of the CBAM file which contains the project's lists, and an identifier for the project Internal data for project list 209 includes the total number of entries on the list, the project ID for the project presently being worked on, and an ID for the next project to be created.

Each entry in library list 205 for a book on an optical disk includes the information about the book from install file 2119 for the volume and the date and time at which the book was installed in the professional research system. Inverted lists permit location of entries in library list 205 by the book's unique ID and by the book's short name. The former inverted list is used to locate a book specified in embedded reference information 2433 for an embedded reference and the latter is used to locate a book specified in connection with the GET BOOK operation. The list's internal data specifies the number of items in the list. The entries in the internal volume list contain information from install file 2119 for each volume about the volumes to which the books in library list 205 belong. The information includes the volume set's unique identifier, a description of the volume set, the number of books in the set, and the number of disks in the set.

The per-project lists are shown in FIG. 25. Desk top list 211 contains an entry (DTLE) 2511 for each book presently being used in a project. Each entry in a preferred embodiment includes the following information:

The book's name, unique ID, volume set name, date of publication, date of installation, and record serial numbers and field identifiers for the fields in the entry for the book in library list 205 which contain the description of the book and the publisher's name.
an identifier for the entry in the project query list which has the last query used for the book.
Whether the book is local or on line, and if it is local, the kind of media.
Whether the book has a reference query list 227.
Information about the last document accessed in the book including the identifier for the document, whether it is being viewed in full or subset mode, and the number of the first word in the last screen viewed, and whether there is a query active for the book.
Information for generating the document lists including a value indicating which of the possible orders is being used for generation of the document lists and the total number of entries in full document list 213 and subset document list 217.
If the book is an on-line book and is the current book, the current on line document ID and information identifying the communications session by which the book is being accessed, any query result, and the number of results for the query.

The internal data includes the total number of entries in the list and the unique book ID for the current book. Inverted lists (DTLILS) 2509 include a list permitting location of entries by unique book ID and one permitting location by short book title. These inverted lists are used to resolve embedded references and to perform the GET BOOK operation a described for library list 205. Desk top list mapping element (DTLME) 2503 determines the order in which DTLEs 2511 are displayed.

As can be seen from the above, DTLE 2511 for each book contains the information required by bookview 219 to restore the display, any active query, and the document lists to the condition they were in the last time a user working on the project used the book. Such restoration occurs when the user resumes working on a project, selects a different book from desk top list 211, performs a GET BOOK operation, or performs a GO TO REFERENCE operation where the embedded reference is to a location in a different book. When the user resumes working on a project, the professional research system use the unique book identifier for the current book to determine which DTLE 251 contains the information bookview 219 requires to restore the display; in the GET BOOK operation, the professional research system uses the short book name to locate the proper DTLE; in the GO TO REF operation, the professional research system uses the unique book ID contained in embedded reference information 2433 to locate the book.

Current information such as the identification for the entry for the current query in the project query list, the document currently being read and the current position in the document, and the state of the document lists are saved whenever a user ceases working on a project while the book represented by DTLE 2511 is the current book or the user performs an action which results in a different book becoming the current book. Examples of such actions are selection of a new book from DTL 211, execution of a GET BOOK operation, and execution of a GO TO REF operation in which the embedded reference refers to a different book.

Project query list 211 is a list of entries 2515 for all of the queries executed by query manager 215 for a project. Each time query manager 215 executes a query, it adds the query to project query list 211. Information in an entry includes the text of the query, the number of documents in which terms satisfying the query were found, the name of the book, and the date the query was last executed. The internal data includes the total number of entries in the list, which is also the record serial number for the last entry in the list. Mapping element (PQLME) 2513 for the list organizes the list so that it is displayed chronologically, with the most recent query (MRPQLE 2517) first. As previously mentioned, the user can display project query list 221 by selecting that option when he strikes RECALL key 319 or selects the Recall menu in query manager state 215.

6.h. Other Types of User Lists

Other embodiments of the professional research system may employ additional user lists. One example of such a user list is a bookmark list displayed by bookview 219. In the professional research system, a bookmark is an association between a user-defined name and a page in a book. Some embodiments of the professional research system permit the user to establish a list of bookmarks for any book on the desk top list. Such a list appears in FIG. 25 as bookmark list 2521. A bookmark list entry (BMLE) 2525 is made by means of a menu in bookview state 219. When "Make bookmark" is selected, a fill-in field appears for the bookmark name. When the user fills in the field and strikes EXEC key 348, an entry is established in the bookmark list for the book which relates the name provided by the user to the page being displayed by bookview state 219. Information in each entry for a bookmark list includes the bookmark name, a description of the book, the book's name, the book's author, the book's publisher, the page referred to by the bookmark, the name and identifier for the document, the identifier for the book, and the creation date of the bookmark. Bookmark list mapping element 2523 specifies an order such as alphabetically by bookmark name for the display of bookmark list 2521.

If there is a bookmark list for a book, information in the desk top list entry for a book will indicate whether there is a bookmark list for the book, and the display of the entry will also indicate whether there is such a list. By selecting the entry for the book and selecting a "Display bookmark list" option from the menu, a user can cause desktop list manager 805 to display the bookmark list for the book. A user may also be permitted to select "Display bookmark list" from a menu in bookview and see the bookmark list for the current book. In the display of the bookmark list, each list entry includes the bookmark name, the name of the document, and the page of the book. The expanded display for the list might include a display for each book of a description of the book, the book's author and publisher, and the date of creation of the bookmark When the user selects an entry in the bookmark list and strikes EXEC key 348, the book to which the bookmark list belongs is located and the page specified in the bookmark is displayed by bookview 219 in the manner described for location and display of an embedded reference. When a bookmark list is being displayed, menu choices permit modification of a bookmark name and deletion of a bookmark entry. Additionally, a user may employ the bookmark name in the GET BOOK operation. In that case, the professional research system responds to the GET BOOK function key or menu selection by making the book the bookmark is for the current book and displaying the location in the book specified in the bookmark.

Other embodiments may further include a project saved query list, (not shown) consisting of query texts which a user of the professional research system has specifically named and saved while working on the project. Contents of a saved query list entry include the query name, the query text, the name of the book it is to be used on, a description of the query, the query's author, the project name, the date it was saved, and the date it was last used. Users can retrieve a saved query text by name from the saved query list and use it in the same manner in which they employ texts from published query list 220 or project query list 221.

6.i. Implementation of GOBACK: FIG. 25

As mentioned in the discussion of bookview state 219 when the professional research system is in bookview state 219, a user may return to the last position in a document from which he made a move which was not relative to his present position in the book by striking GO BACK key 307 or making a corresponding selection from the menu displayed in bookview state 219. In a preferred embodiment, GO BACK is implemented by means of go back list 2527 in the CBAM file containing the project lists. The GO BACK list is a stack 2531 (LIFO) of bookview information saved for each of the last 30 non-relative moves in bookview state 219. Each time a non-relative move occurs, a GO BACK list entry is pushed onto the GO BACK list. In a preferred embodiment, non-relative moves include the following:
Exiting from bookview state 219 to another state.
Performing a GO TO PAGE operation which specifies a named page.
Successfully performing a GO TO REF operation.
Successfully performing a GET BOOK operation.
In the preferred embodiment, all other movements in bookview state 219, including a GO TO PAGE operation which specifies a page by means of a relative page number, a GO TO DOC operation, and a NEXT or PREV TERM operation are relative movements and do not result in a saving of bookview information.

The kind of bookview information saved in a GO BACK list entry (GBLE) 2533 depends on whether bookview 219 was displaying a portion of a book stored on an optical disk or a portion of an on-line book. In the first case, the information is the following:
the unique identifier for the book being displayed the identifier for the document being displayed
the number of the first word in the display
the entry number for any query being performed in project query list 221
whether the book was being viewed in full or subset mode
what order was being used for the document lists.

In the second case, the unique book ID and the document ID are stored as above, but the remainder of the information is the following:
the position of the line in the document at which the display begins
an identifier for the on line session which referenced the document
an identifier for the action which caused the GO BACK state to be saved
A description of any action which has to be performed to return to the GO BACK state.

An example for a description is the text of the query whose results were being displayed when the non relative move occurred.

In a preferred embodiment, the stack is implemented by means of data elements for 30 GO BACK list entries and a mapping element (GBLME) 2529 which maps entry sequence numbers for the 30 stack entries onto the record serial numbers for the entries. Bookview 219 keeps track of top and bottom of stack pointers containing the entry sequence numbers for the GO BACK list entries which are currently at the top and bottom of the stack and the usual stack operations are performed. If the stack overflows, the GO BACK information for the new top entry is stored in the previous bottom entry and the top and bottom pointers are adjusted accordingly; if it underflows, an error message is returned to bookview state 219.

When a user of the professional research system performs a GO BACK operation, either by means of GO BACK key 307 or by means of a menu selection, bookview 219 saves the current bookview information, compares the saved current information with the bookview information in the top entry of the GO BACK list, and performs whatever operations are necessary to cause bookview 219 to display the location specified by the top entry's bookview information. For example, if the current bookview information differs from the bookview information in the top entry only with regard to document ID and/or word number, bookview 219 simply displays the specified document beginning at the specified word; if it differs with regard to document order, bookview 219 also has document list manager 807 reconstruct the document lists; if it differs with regard to view mode, bookview further shifts from one mode to the other and has document list manager 807 reconstruct the subset document list as necessary; if it differs with regard to the query, bookview 219 additionally has query manager 215 reexecute the query and thereupon has document list manager 807 reconstruct the subset query list; if it differs with regard to the book ID bookview 219 still further performs the operations described for GET BOOK, including establishing a connection to on-line data base 227 if the restored state specifies an on line book.

Once bookview 219 has displayed the location specified in the top entry's bookview information, it waits for the user to strike a key. If the user strikes anything other than CANCEL key 341, the top entry is popped from the GO BACK list and becomes the current bookview state; if the user strikes CANCEL key 341, the top entry is not popped and the saved current state is restored as the current state. The user can continue to perform the GO BACK operation until there are no entries remaining in the GO BACK list; at that point, bookview 219 provides the user with a "GO BACK list empty" error message.

7. Conclusion

The foregoing Description of a Preferred Embodiment has disclosed to one of ordinary skill in the art how to make and use an improved research apparatus. The improved research apparatus disclosed herein has many advantages. It has capabilities which permit a user to easily resume work on a project, and thereby permit the user to easily work on several different projects over a period of time. When a user resumes work on a project, the research apparatus displays the last location accessed in the last book used in the project and behaves with regard to queries and operations involving movement in the book as if there had been no interruption of work.

The user can select books as required for each project from a library of books available to all users of the improved research apparatus. The books may be stored locally or may be accessible by means of a communications link. A user of the research apparatus can work with equal ease on locally or remotely stored books. When the user selects a remotely stored book, the research apparatus automatically establishes the communications link necessary to access the remotely-stored book.

Another advantage of the research apparatus is that the order in which a user views documents in the book is determined by a document list which is published with the book. When the user executes a query on a book, the result is a subset list which lists documents which satisfy the query in the same order as they appear in the document list for the book. A publisher may provide more than one order for a book's document list and a user may select among the document orders.

The research apparatus makes query formulation easier by retaining for each project the last query run on each book being used in the project and a list in chronological order of all of the queries run in the project. A user can select one of these queries and can edit it to produce a new query, and can thus easily narrow his search. Users can employ published queries accompanying some of the books in the same fashion as the saved queries.

In order to permit a user to go back to a previous display of a book, the research system automatically saves display state each time the user makes a movement in a book which is not relative to the user's current position in the book. By striking a key, the user can restore the display previous to the present one, the one previous to the restored display, and so forth.

The research apparatus improves the following of embedded references by specifying more than on book and location containing the information referred to where that is possible. When the user requests the research apparatus to go to a reference, the research apparatus looks to determine the "closest" location of the information specified in the reference. Thus, if the information is in the same book, it goes to that book. If the information is available in a book in the library, the research apparatus automatically does all that is required to display the location in the book that contains the information. Where there is a choice between displaying an on line book and a book which is locally available, the research apparatus automatically chooses the local book.

Users of the research apparatus can mark locations in books which they wish to refer back to by means of named bookmarks. When the user specifies the bookmark, the research apparatus automatically displays the location specified in the bookmark.

The research apparatus also includes a notebook for each project. The notebook is fully integrated into the research apparatus. It is accessible whenever the user is working on the project and can be edited in the same manner as a word processing document. When the research apparatus is displaying text of a book, the user can copy a portion of the displayed text to the notebook and edit the copied portion in the same manner as a word processing document.

A particularly significant advantage of the improved research apparatus is the use of lists to make selections. A user selects the project he wishes to work on from a list of projects; the selection of the project automatically places him in the desk top list for the project, which lists all of the books being used in the project. A selection of a book from the desk top list automatically results in the display of the last location read in the selected book. If the user wishes to add a book to his project, he selects a book from a library list; the selection places him in the desk top list for his project. If the user wishes to select a specific document in a book, he can select from a list of all of the documents in the book, in the order selected by the user, or from a list of the subset of the documents which satisfy a query. Upon selection, the research apparatus automatically displays the selected document. The user may further can select a query from lists of queries used by the project or published queries, and can select a bookmark from a list of bookmarks.

While the foregoing disclosure has disclosed a presently-preferred embodiment of the research apparatus, many other embodiments are possible. The preferred embodiment is thus exemplary and not restrictive and the scope of the appended claims is not limited to the embodiment of the invention disclosed herein, but includes any embodiment equivalent thereto.

What is claimed is:

1. Apparatus for performing plural research projects with respect to information contained in a reference library of books, said apparatus comprising, in combination;
    display means;
    input means for receiving inputs from a user;
    readable database storage means for storing the test content of said reference library of books;
    readable and writable storage means for storing library information concerning at least selected books in said reference library, and for further storing project state information for each given one of said research projects, said project state information specifying, combination;
        the names of the books selected from said library for use in connection with said given project,
        the identification of the particular book currently selected for review in connection with said given project, and
        the location within said particular book of the specific text passage most recently displayed on said display means in connection with said given project; and
    processing means coupled to said readable book storage means, said readable and writable storage means, said display means, and said input means, said processing means comprising, in combination
        means responsive to an input from the user indicating resumption of work on a given project for automatically causing the display means to display a visual representation of at least a portion of said project state information, including the names of said books previously selected for use in connection with said given project,
        means responsive to an input from the input means requesting display of a visual representation of said particular book currently under review for causing said display means to display a visual representation of a specific text passage,
        means responsive to a current book selection input from the user for altering the project state information for said given project to identify a newly selected book as the particular book currently under review,
        means responsive to a select from the library input from the user which specifies an additional book in said reference library for transferring information concerning said additional book from said stored library information to said stored project state information for said given project.

2. The research apparatus set forth in claim 1 and wherein:
    the processor means responds to a display library information input received on the input means by causing the display means to display a visual representation of a portion of the library information, the select from library input selects library information from the displayed portion, and the processor means further responds to the select from library input by causing the display means to display the visual representation of the given project's project state.

3. The research apparatus as set forth in claim 1 and wherein:
    the processing means further responds to an input from the input means specifying a new book as the current book by first determining whether there is desk top information for the new book in the project state and if there is, making the new book the current book and if there is not, determining whether there is library information for the new book and if there is, providing library information for the new book to the desk top information and thereupon making the new book the current book.

4. The research apparatus set forth in claim 3 and wherein:
    the input specifying a new book further specifies a location in the book; and
    the processor means further causes the display means to display a portion of the new book containing the specified location.

5. The research apparatus set forth in claim 1 and wherein:
    certain of the stored books contain one or more references to information located elsewhere in the stored book or in other stored books;
    each reference includes one or more location specifiers specifying a stored book containing the information and the location therein of the information; and when the processor means is causing the display means to displaying a portion of the text of one of the certain stored books and an input from the input means specifies that the research apparatus is to go to a selected reference, the processor means determines whether a location specifier belonging to the selected reference specifies one of the books for which there is desk top information in the project state, and if it does, makes that book the current book, and if it does not, determines whether one of the location specifiers specifies one of the books for which there is library information, and if it does, providing library information for that book to the desk top information and thereupon making that book the current book, and after having thus established the current book, causing the display means to display a portion of the text of the current book containing the location indicated in the location specifier specifying the current book.

6. The research apparatus set forth in claim 5 and wherein:

the non volatile storage means includes local storage means which is directly coupled to the processing means and which contains local stored books and remote storage means which is coupled to the processing means via communications means and which contains remote stored books;

when a remote stored book is the current book, the processing means automatically accesses the current book via the communications means; and when there is more than one location specifier in the reference, the processing means employs any location specifier specifying a remote book only if none of the other location specifiers specifies a local book.

7. The research apparatus of claim 1 and wherein:

the desk top information for each of certain of the books further includes bookmark information for one or more bookmarks, the bookmark information including a bookmark name and a location in the book; and the processor means responds to input from the input means specifying a bookmark name by making the stored book to which the bookmark belongs the current book and causing the display means to display a portion of the text of the stored book containing the location specified in the bookmark.

8. The research apparatus set forth in claim 1 and wherein:

the book storage means further includes search information permitting searching of certain of the stored books by means of a query;

the processor means responds to a query input from the input means and to a query execution input from the input means to execute the input query on the current book.

9. The research apparatus set forth in claim 1 and wherein:

the readable and writable storage means further stores project identification information for each of the research projects being performed on the research apparatus;

the display means further displays a visual representation of the project identification information; and when the display means is displaying a visual representation of the project identification information and an input from the input mean selects one project from the project identification information, the processor means responds thereto by causing the display means to display the visual representation of the project state for the selected project.

10. The research apparatus set forth in claim 1 and wherein:

the project state further includes a project notebook in which information may be stored in an editable format;

the processor means responds to an input from the input means indicating that the user wishes to use the project notebook by causing the display means to display information from the project notebook and thereupon responds to an editing input from the input means by editing the information in the project notebook as specified by the editing input.

11. The research apparatus set forth in claim 10 and wherein:

when the display means is displaying a portion of the text of the current book, the processor means responds to an input from the input means indicating that the user wishes to copy a specified portion of the text being displayed from the current book to the project notebook by copying the specified portion from the current book to the information in the project notebook and thereupon causing the display means to display information from the project notebook and responding to an editing input from the input means by editing the information as specified by the editing input.

12. The research apparatus as set forth in claim 11 and wherein:

the text of the stored books is stored in a format which is editable when copied to readable and writable storage means.

13. Apparatus for performing research upon a reference collection of books, said apparatus comprising, in combination, display means;

input means for receiving inputs from a user;

readable book storage means for storing;

a) the text of each book in said reference collection, and b) searchable information relating to at least a subset of books in said reference collection, said searchable information enabling the test within those books within said subset which match a query to be more rapidly identified;

readable and writable storage means for storing project state information for each of plural research projects performed on said apparatus, the project state for a given project including:

a) an indicator of a current location in the specific book most recently reviewed in connection with said given projects, and b) a list of the queries previously used in connection with said given project of the named stored books which may be searched by means of a query and have been so search in the project includes the last query used to search the book; and processor means coupled to said display means, said input means, said readable book storage means, and said readable and writable storage means, said processor means comprising, in combination, a) means responsive to a first input from the user for causing said display device to display a list of said research projects, b) means responsive to a second input from the user for selecting a specific one of said projects displayed as the current project, c) means responsive to a third input from the user for displaying the list of queries previously used in connection with said selected current project, d) means responsive to a fourth input from the user for selecting a specific query from said displayed list, and e) means responsive to a fifth input from the user for executing the specific query selected from the display list whereby queries previously composed in connection with a project can be readily re-executed to return said research apparatus to a desired prior state.

14. Apparatus as set forth in claim 13 wherein said processor means further includes means responsive to editing inputs from the user for modifying said specific query prior its execution whereby the user interactively improve a prior query based on the results obtained by the execution of said prior query.

15. The research apparatus set forth in claim 13 and wherein:

the display means displays the queries executed in the project in chronological order.

16. The research apparatus set forth in claim 13 and wherein:

a book includes one or more documents;

the query state further specifies for each query the name of the book upon which the query was run and the number of documents which satisfy the query; and the visual representation of each query displayed in the portion includes the name of the book and the number of documents which satisfy the query.

17. Apparatus for performing research upon a reference collection of books, said apparatus comprising, in combination, display means;

input means for receiving inputs from a user;

readable book storage means for storing:

a) the text of each book in said reference collection, b) searchable information relating to at least a subset of books in said reference collection, said searchable information enabling the text in those books within said subset which match a query to be more rapidly identified; and c) a set of predefined queries for searing said subset of books, readable and writable storage means for storing project state information for each of plural research projects performed on said apparatus, the project state for a given project including:

a) a list of the queries previously used in connection with said given project, and b) an identification of the last query executed in the course of said given project; and processor means coupled to said display means, said input means, said readable book storage means, and said readable and writable storage means, said processor means comprising, in combination, a) means responsive to a first input from the user for causing said display device to display a list of said research projects, b) means responsive to a second input from the user for selecting a specific one of said projects displayed as the current project, c) means responsive to a third input from the user for displaying the list of queries previously used in connection with said selected current project, d) means responsive to a fourth input from the user for selecting a specific query from said displayed list or form said set of predefined queries, means responsive to editing inputs from the user for modifying the specific query selected, and f) means responsive to a fifth input from the user for executing the query as modified, whereby queries previously composed in connection with a project can be readily re-executed to return said research apparatus to a desired prior state, and said predefined queries previously executed may be executed in modified form to provide enhanced search results.

18. An computer information retrieval system comprising, in combination, at least one keyboard for accepting inputs from a user, said inputs including:

a) project information designating each project to be performed on said information retrieval system, b) queries expressed as search requests executable by said information retrieval system, c) book selection requests, and d) list display requests, means for visually displaying data to the user specified by said list display requests, readable reference database storage means for storing:

a) plural books, each of said books comprising plural documents, and each document comprising natural language text, b) an ordered book list containing descriptive information on each of said plural books, c) an ordered document list for each given one of said books containing bibliographic information on each of the documents contained within said given book, and d) search information for at least a subset of said books which may be rapidly searched by a query to identify documents within said subset of books containing text which matches the criteria specified in said query, readable and writable storage means responsive to said inputs for automatically storing and updating:

a) a project list containing descriptive information including said project information for each of plural projects previously or currently being performed on said system, b) a desktop list for each given one of said projects which identifies each of the books selected for use in connection with said given project by book selection requests accepted from the user during the course of said given project, c) a project query list for each of said projects which specifies the content of prior queries previously executed in the course of each said project, and means for responsive to user request for selectively displaying the contents of any selected one of said lists whereby, for any one of said projects, the user may visually display the status of and the prior results achieved by any of said projects.

19. A system as set forth in claim 18 wherein said readable and writable storage means further includes means for automatically storing and updating a subset document list associated with each query on said project query list, said subset document list specifying the documents identified as a result of the execution of the associated query; said system further including means responsive to user request for displaying the contents of said subset document list for a query specified by the user from said project query list.

20. A system as set forth in claim 19 including means responsive to user request for displaying the text of a document selected by the user from the displayed contents of a subset document list.

21. A system as set forth in claim 19 further including means for selectively displaying the contents a subset document list in chronological order based on the date of the document or alternatively in order by page number based on the documents' position within the book relative to other documents in the same book.

22. A system as set forth in claim 18 wherein said readable and writable storage means further includes means for automatically storing and updating bookmark information for at least selected ones of said books, and wherein said system includes means for displaying the text specified by said bookmark information upon the user's request.

23. A system as set forth in claim 18 including means for automatically storing information identifying text being displayed in a sequence of go back state instances, and means responsive to user request for retrieving selectively retrieving said go-back indications to reistate the display in a previous state.

24. The research apparatus set forth in claim 23 and wherein:
the instances of the go back state form a stack;
when the processing means saves the instance of display state, the processing means pushes the instance onto the stack; and
when the processing means responds to the input from the input means specifying resumption of the display, the processing means pops the top instance from the stack and employs the top instance to resume the display specified therein.

25. Apparatus for performing plural research projects each involving the performance of searches for specified information in a reference library of books composed of natural language text, said apparatus comprising, in combination,
a computer system including a keyboard for accepting input information from a user, means for visually displaying output information to the user, optical drive disk drive means for reading information stored on interchangeable optical disks, and a magnetic disk drive for reading information from and writing information to a writable disk,
a collection of optical disk volumes for storing said library of books, each given one of said disk volumes storing book files and an install file, said install file including a descriptive identification of said given disk volume and a description of each book stored on said given disk volume,
means for transferring the information contained in the install file of available ones of said interchangeable disks to a library list stored on said writable disk,
means for accepting from the user a project description for each of said research projects and for transferring said project description to a project list on said writable disk,
means responsive to an input from the user for displaying information from said library list,
means responsive to an input from the user for selecting one or more books identified in said library list for use in connection with a selected one of said research projects and for transferring the information concerning the selected books from said library list to a desk top list for said selected research project, the desk top lists for said plural research projects being recorded on said writable disk, and
query handling means responsive to input information from the user for formulating queries for specific text information and for executing said queries by searching for said specific text information in source books selected from the books specified on the desk top list for said selected one of said projects, said searching being accomplished by reading information from those optical disk volumes designated for said source books, said query handling means including means for displaying a mount request to the user whenever the next selected source book to be searched is recorded on a disk volume which is not mounted on said optical disk drive means.

26. The apparatus for performing plural research projects set forth in claim 25 further comprising, in combination, means for storing a query list for each of said research projects, said query list containing those queries formulated by the user in the course of that project, and further containing information relating to the results achieved by executing said queries.

27. The apparatus for performing plural research projects set forth in claim 25 wherein said books are subdivided into documents and wherein said book files recorded one each of said optical disk volumes include a documents list containing descriptive information for each of the documents recorded on that disk volume and wherein said apparatus further includes means for transferring information from said documents list to a project document list recorded on said writable disk for each of said research projects, said project document list containing descriptive information concerning those documents contained within selected books specified in said desk top list for the corresponding project.

28. The apparatus for performing plural research projects set forth in claim 27 further comprising, in combination,
means responsive to an input from said keyboard for displaying at least a portion of said project list,
means responsive to an input from said keyboard for selecting one of the projects displayed from said project list as the currently active project and for displaying information from the desk top list for said currently active project.

29. The apparatus for performing research set forth in claim 28 further including means responsive to an input from the keyboard for displaying information from the query list for said currently active project.

30. The apparatus for performing plural research projects set forth in claim 28 wherein said displayed information from said desk top list includes a displayed list of the books selected for use in connection with said currently active project and wherein said apparatus further includes means for selecting one of the books on said displayed list of books as the currently active book.

31. The apparatus for performing research set forth in claim 28 further including means responsive to an input from the keyboard for reading and displaying information from the project document list for said currently active project.

* * * * *

UNITED STATES PATENT AND TRADEMARK OFFICE
CERTIFICATE OF CORRECTION

PATENT NO.   : 5,157,783
DATED        : October 20, 1992
INVENTOR(S)  : Anderson et al It is certified that error appears in the above—identified patent and that said Letters Patent is hereby corrected as shown below:

Column 47, line 52, delete "test", insert --text--

Column 49, line 22, delete "non volatile", insert --non-volatile--

Column 50, line 39, delete "a", insert --the--

Column 50, line 45, delete "test", insert --text--

Column 51, line 40, delete "a", insert --the--

Column 51, line 48, delete "searing", insert --searching--

Column 52, line 7, delete "means", insert --e) means--

Signed and Sealed this

Twelfth Day of October, 1993

*Attest:*

BRUCE LEHMAN

*Attesting Officer*  *Commissioner of Patents and Trademarks*